(12) United States Patent
Pierson et al.

(10) Patent No.: US 8,074,431 B1
(45) Date of Patent: Dec. 13, 2011

(54) HYBRID PALLETIZER

(75) Inventors: Cary M. Pierson, Milwaukie, OR (US); Stephen L. Heston, West Linn, OR (US)

(73) Assignee: Top Tier, Inc., Clackamas, OR (US)

( * ) Notice: Subject to any disclaimer, the term of this patent is extended or adjusted under 35 U.S.C. 154(b) by 178 days.

(21) Appl. No.: 12/476,124

(22) Filed: Jun. 1, 2009

(51) Int. Cl.
*B65B 63/02* (2006.01)
*B65B 35/50* (2006.01)
*B65G 57/03* (2006.01)
*B65G 57/06* (2006.01)

(52) U.S. Cl. ............ 53/529; 53/537; 53/540; 53/556; 53/587; 414/791.6; 414/793.4; 414/794.3; 414/799

(58) Field of Classification Search .......... 53/523, 53/529, 537, 540, 556, 587; 414/791.6, 792.6, 414/792.7, 793.4, 793.8, 794.3, 799; *B65B 35/50; B65G 57/06*

See application file for complete search history.

(56) References Cited

U.S. PATENT DOCUMENTS

| | | | |
|---|---|---|---|
| 2,822,932 A * | 2/1958 | Patrick | 53/540 |
| 2,875,908 A * | 3/1959 | Woodcock | 414/794.3 |
| 2,883,074 A * | 4/1959 | Boehl et al. | 414/792.6 |
| 3,471,038 A * | 10/1969 | Verrinder | 414/792.6 |
| 3,529,732 A * | 9/1970 | Wayne | 198/799 |
| 3,669,282 A | 6/1972 | Carlson | |
| 3,844,422 A | 10/1974 | Smith et al. | |
| 3,876,057 A | 4/1975 | Jones | |
| 4,022,334 A | 5/1977 | Lassig | |
| 4,060,957 A | 12/1977 | Birkenfeld et al. | |
| 4,067,456 A | 1/1978 | Schmitt | |
| 4,162,016 A | 7/1979 | Schmitt | |
| 4,195,959 A | 4/1980 | Schmitt | |
| 4,205,934 A | 6/1980 | Pantin et al. | |
| 4,234,280 A | 11/1980 | Donnelly et al. | |
| 4,439,084 A | 3/1984 | Werkheiser | |
| 4,593,517 A | 6/1986 | Mattila | |
| 4,614,473 A | 9/1986 | Kwauka et al. | |
| 4,704,060 A | 11/1987 | Winski et al. | |
| 4,978,275 A | 12/1990 | Reid et al. | |
| 4,995,224 A | 2/1991 | Yourgalite et al. | |
| 5,005,335 A | 4/1991 | Yourgalite et al. | |
| 5,046,303 A | 9/1991 | Becicka et al. | |
| 5,139,388 A | 8/1992 | Martin | |
| 5,169,284 A | 12/1992 | Berger et al. | |

(Continued)

FOREIGN PATENT DOCUMENTS

CH 675574 A5 * 10/1990

(Continued)

*Primary Examiner* — Stephen F Gerrity
(74) *Attorney, Agent, or Firm* — Hancock Hughley LLP

(57) ABSTRACT

The present invention relates to compact palletizers that include a stretch-wrap operation as the pallet is built. Specifically, the present invention uses a robot to place items from a fixed infeed elevation either above or, alternatively, below the height of the finished load. A four-sided compression mechanism compresses the rough-built load to the final pallet size and then the entire layer is released to the pallet.

Individual items or group of items are picked and placed onto a layer support device in a loose orientation. The loose orientation enables a much faster palletizing operation because the robotic arm that pick-and-places the item, the items, or the row of items, can travel much faster as it does not have to precisely locate the item, items, or row of items. During the time that a layer is being loosely constructed on the layer support device concurrent wrapping can occur.

19 Claims, 29 Drawing Sheets

U.S. PATENT DOCUMENTS

| | | |
|---|---|---|
| 5,193,973 A | 3/1993 | Tubke |
| 5,203,671 A | 4/1993 | Cawley et al. |
| 5,372,472 A | 12/1994 | Winski et al. |
| 5,496,599 A | 3/1996 | Schwartz et al. |
| 5,498,122 A * | 3/1996 | Miura et al. ............... 414/794.2 |
| 5,623,808 A | 4/1997 | Franklin et al. |
| 5,758,471 A | 6/1998 | Denley et al. |
| 5,873,214 A | 2/1999 | Moore et al. |
| 5,893,258 A * | 4/1999 | Lancaster, III .................. 53/529 |
| 6,238,173 B1 | 5/2001 | Corsini |
| 6,533,533 B1 | 3/2003 | Heston |
| 6,594,970 B1 | 7/2003 | Hyne et al. |
| 6,658,816 B1 | 12/2003 | Parker et al. |
| 6,860,088 B2 | 3/2005 | Goodman |
| 2005/0063815 A1 * | 3/2005 | Pierson et al. ................ 414/799 |

FOREIGN PATENT DOCUMENTS

| | | |
|---|---|---|
| EP | 1457442 A1 * | 9/2004 |
| WO | WO 2007118988 A1 * | 10/2007 |

* cited by examiner

HYBRID PALLETIZER

BACKGROUND

The present invention relates generally to item manipulation, and particularly to manipulation of entire layers of items during handling operations.

Palletizing generally refers to a process of constructing a stack of items organized as layers on a pallet. A pallet is a standard support and carrier structure used in shipping and provides a support surface for receiving items stacked for transport. Efficient shipping of palletized items calls for efficient stacking of items on the pallet to minimize open space within the stack. Accordingly, a variety of "item patterns" have emerged for efficient and stable packing together of items in item layers on a pallet. In some applications unit loads are built effectively identical to loads on pallets absent the pallet itself with a slip sheet providing load support or without any underlying support structure. Whether loads are built on pallets or without pallets, the common art name is palletizing.

Two common methods on palletizing consist of layer building palletizers and robotic pick and place palletizing. Layer building palletizers typically employ various mechanisms to manipulate items into rows of items spaced and turned appropriately to construct rows. Rows of items are then transferred to a layer assembly platform through various means until a layer is completed. Depending on the location of the of the layer assembly device, the completed layer is transferred to the load under construction. Typically the layer construction device has a layer support surface commonly called an apron. The apron can be rigid or flexible and in either style the apron is pulled from under the layer of items to deposit the layer on the pallet or previously deposited layer. Prior to deposit it is common to condition the layer that may be loosely assembled using various clamping means. Where the layer is assembled relative to the load under construction varies. Layers can be built horizontally offset then raised or lowered then moved horizontally for deposit. The layer can be assembled above the load under construction and either the layer assembly device is lowered to the load under construction for deposit or the load itself is raised to the fixed layer assembly device that opens to deposit the layer. A third method is to build less than complete layers that are transferred to the layer assembly device that vertically positions above the load under construction. All methods and techniques used are common in the art of layer building palletizing.

Robotic pick and place palletizing utilizes a programmable mechanism to pick and place an item, item groups or previously constructed layers from a picking location to pallet load under construction. Unless the layer was previously constructed by other means, the pick and place device picks and places items into their finished position on the load under construction. A characteristic of such pick and place actions is the item or items are picked in such a manner that the actual gripping device does not hinder final positioning of items or items on the load. Top picking vacuum gripping systems are most common where there is no gripping mechanism below the top of the item or items being picked and placed allowing tight placement of item or items adjacent to each other on the load under construction. Side gripping devices or bottom support devices are alternative gripping devices. Side grippers are effective and more positive than top picking vacuum methods, but whatever the thickness of the side gripper is becomes a void in the finished load unless the pick and place device performs a secondary bump to remove the void. Bottom support devices are more problematical if a tight finished load is desired as the bottom support must have horizontal clearance to disengage from supporting the item or items bottom when depositing. Typically the horizontal space is at the periphery of the load or the load pattern allows space interior to the load that limits load pattern flexibility. Regardless of the item or items pick and place gripping device employed all typically need to slow down for accurate final placement and in most instances move items or items at speeds slower than the programmable mechanism is capable of due to insecure gripping. The most common top picking vacuum gripping method is especially susceptible to insecure handling requiring slower speeds.

There are two deviations to the above generalities about item or items gripper technologies employed by pick and place palletizers that apply to bag handling and full layer handling. Bags are typically handled with a basket style gripper that surrounds the bag in a clamp including supporting a substantial part of the bag bottom. The basket gripper opens dropping the bag into position onto the load under construction from an elevation allowing clearance for the basket to open. Dropping the bag is often preferred as dropping allows the pliable bag content to deform to the previously deposited bags creating a tighter load. Because the bag is contained in the basket and final placement accuracy is less critical the pick and place device often can operate at higher speeds than the same pick and place device will operate with previously discussed item or items handling devices. Often speeds are 20% faster when an identical programmable item pick and place device is assembling an identical pattern of bags compared to rigid containers indicative of the advantage of bottom support and less accurate final positioning provides. The second differentiating method of pick and place palletizing is full layer handling. Commonly the full layer is preassembled by various means into a tight configuration then the layer is picked and placed using top vacuum, side clamping or bottom support means so that the layer can be picked and place onto the load. Some bottom supporting methods will receive a loosely assembled layer and perform secondary layer conditioning into a tight configuration during the pick and place cycle.

Nearly all finished loads are stretch wrapped prior to shipment to secure the load against disruption from the rigors of transportation. As such if palletizing and stretch wrapping are combined into one location there are benefits in space savings in that space for secondary stretch wrapping operations are unnecessary and many less stable loads benefit from the stability imparted by stretch wrapping while load building. There are three primary prior art patents related to palletizing and stretch wrapping that employ palletizing methods discussed earlier. For example, Yourgalite, in U.S. Pat. No. 4,995,224, teaches picking and placing an item or groups of items on an offset turntable where wrapping occurs as the load is built. Items or groups of items are positioned in the final load build position only if the turntable is not rotating; this requires that no items be palletized when the stretch wrapping operation is active. Second, Denley in U.S. Pat. No. 5,758,471 teaches building a full layer of rows of items at a horizontally offset position below the finished load height then transferring the layer for deposit to the load under construction. During layer construction at an adjacent offset position the stretch wrapper can operate providing concurrent layer building and load wrapping. And thirdly, Heston in U.S. Pat. No. 6,533,533 teaches building a full layer of rows of items with items entering at an elevation above the finished load height in the same vertical space as the stretch wrap turntable occupies. Layers can be simultaneously built while palletizing occurs.

Despite the current state of the art, there remains a need for a compact palletizer that more quickly and more efficiently creates layers for palletizing and more quickly builds an entire pallet of items. One attempt to create a more efficient palleting device includes the device of Corsini in U.S. Pat. No. 6,238,173. Corsini teaches an apparatus for placing items in groups on pallets according to a pre-set planar configuration. An up-stream forming machine discharges items pre-grouped into stacks. The apparatus comprises a pallet loading station with a movable arm fitted with a claw for gripping at least one rank of stacks and positions the rank onto the plane of the pallet. In yet another example, Yourgalite in U.S. Pat. No. 5,005,335 instructs that a set of boxes should be accumulated before they are picked up by a robotic palletizer and transferred to a turntable.

TopTier, Inc of Portland, Oreg. manufacturers several palletizer models including two row building palletizers with concurrent stretch wrapping. High and low infeed models build rows that are transferred to a layer build table that vertically reciprocates above the stretch wrapper turntable. While the turntable is wrapping, subsequent layers can be built on the layer head. Another low infeed version used for higher speeds assembles less than a layer on a vertically reciprocating deck. The pre-arranged item groupings of partial layers are then transferred to a layer assembly device that occupies the vertically space above the turntable. Once sufficient partial layer groups are transferred to the layer assembly device the layer is deposited onto the load under construction. Layer groupings can continue to be transferred to the layer assembly device while the turntable is wrapping allowing concurrent stretch wrapping The above methods can successfully palletize and stretch wrap or palletize and concurrently stretch wrap with limitations. The current state of the art of pick and place methods and known devices must cease load building while wrapping occurs. These known construction and layer deposit methods include many complex mechanisms to accomplish palletizing and their throughput speed is limited by the inability to queue more than one layer without increasing machine complexity during final wrap and load pallet exchange time limiting total load throughput speeds to about a layer every 45 seconds.

However, Denley, in U.S. Pat. No. 5,758,471, teaches one means to queue more than one layer during wrapping operation utilizing more than one stacked apron.

Yet, there still remains a need for a palletizing devices and methods that improve total load throughput speeds, reduce complexity of components, maintain or improve upon a compact footprint and that can provide the benefits of more effective concurrent stretch wrapping. There is a need for a hybrid palletizer adapted to overcome the limitations of the known state of the art and provide a palletizing solution that is smaller, faster, and lower cost (to manufacture, operate, and maintain) compared to the current devices. Such an improved hybrid palletizer should further provide new capabilities unavailable utilizing the best attributes of established methods of palletizing.

As discussed, pick and place palletizers are often constrained to lower speeds than the mechanism are capable of operating at because speed must be reduced to perform exact placement of an item or items as the load stack is built directly on the load under construction. Proper finished loads require tight uniform stacks of items on the pallet so precise positioning is a necessity. Furthermore methods of gripping an item or items can also reduce speed potential as the gripper is not capable of retaining items or items at higher speed potential. Or, gripper methods that allow fast speeds compromise item or items placement by requiring gaps or clearance for gripper removal.

Thus, there also is a need for a hybrid palletizing solution that employs a pick and place device depositing an item or items to an intermediate oversized layer assembly platform that provides cures for the shortcomings discussed above.

SUMMARY OF THE INVENTION

The present invention relates to compact palletizers that include an infeed conveyer at a fixed vertical height or elevation relative to the finish load height. Further, this invention relates to compact palletizers that include a stretch-wrap operation to wrap layers of the partially built load as the load continues to be built. Specifically, the present invention uses a robot to pick and place items from a fixed infeed elevation either above or, alternatively, below the height of the finished load. An item or items are picked and placed loosely to a layer assembly device that is larger than the finished layer, so a four-sided compression mechanism compresses the rough built load to the final pallet size and then the entire layer is released to the pallet.

To overcome the limitations of the current state of the art, the present invention in a preferred embodiment comprises a hybrid palletizer system. This hybrid palletizer system includes an oversized layer assembly platform, which provides additional space for an item or items to be roughly positioned as the oversize layer assembly platform utilizes secondary layer conditioning that compacts the layer prior to deposit. Furthermore, in the preferred embodiment the item or items gripper can provide both bottom support and a pinch-like grip. This requires that there is clearance available for the bottom supporting aspect of the gripper to be removed from under the item or items. The item or items can also be tightly gripped for maximum speed movement.

A further advantage of the hybrid solution is the pick and place layer construction on an oversized layer assembly device is not restricted to assembling one level on the device. Higher rates can be achieved by reducing the number of layer deposit cycles by stacking more than one layer between each deposit.

Additionally the oversized layer assembly platform can receive an item or items immediately adjacent to the pick and place device then index the layer support surface presenting new unoccupied layer support surface for more items until a layer is completed. Pick and place motion travel distance of each cycle is substantially reduced to further increase speeds. Such capabilities can allow the use of a smaller less expensive and faster pick and place devices because the range of motion requirements of the pick and place device is less. Additional speed increases are possible by stacking more than one level of items with each index cycle reducing time required for layer deposit while utilizing the above methods.

Concurrent wrapping can occur while layers are constructed on the oversized layer assembly device as pick and place palletizing to the oversized layer assembly platform can continue during wrapping operations. When the method of stacking more than one layer either directly or on an indexing layer support platform is utilized with concurrent wrapping throughput potential is increased as layer condition and deposit cycles are reduced. Completion of final load wrap and pallet exchange is time consuming requiring about 45 seconds. The ability to assemble more than one layer during that time using either method further enhances the viability of concurrent wrapping as potential throughput is increased.

Some items or items that are particularly well suited for top picking with vacuum eliminating the advantage of bottom support and necessary bottom support removal clearance or bag items that are dropped with or without side constraints do not necessarily benefit from an oversized layer assembly platform. Such item or items can be deposited directly onto a layer assembly platform with or without fixed side constraints simplifying the mechanism. While the platform is loaded with one or more layers concurrent wrapping can occur. Because concurrent wrapping occurs when the unwrapped load height is equal to or greater than the film width, the layer support platform can be open during deposit while one or more than one layer is directly deposited to the load until the necessary load height is achieve for wrapping, then the floor can close continuing to receive items until a layer or layers are assembled while wrapping occurs. The methods above minimize time required for layer clamping when utilized and floor removal optimizing throughput potential when concurrently wrapping.

Layer conditioning and layer deposit can impact potential throughput if the time required is greater than a single pick and place cycle. Throughput speed can also be compromised if the pick and place device must perform significant vertical movement due to increasing load height as the load is built. If an intermediate partial layer build platform positioned at the optimal elevation relative to the pick and place device is used to receive items one or more partial layers high, improved throughput will result. For example if the intermediate platform is approximately half the size of the oversized layer build platform horizontal pick and place reach requirements are reduced and vertical travel can be optimized as the intermediate platform can always position at an ideal height relative to the pick and place device. Once the intermediate platform has received one or more partial layers the intermediate platform can quickly vertically shuttle to transfer its items to the oversized layer build platform where a completed layer can be conditioned and deposited while the intermediate platform continues to receive items. The combination of optimized pick and place motions with reduced horizontal and vertical reach requirements and quick transfers to the oversized layer build platform increases throughput potential with and without concurrent stretch wrapping.

The pick and place methods discussed above can occur when items are entering the hybrid palletizer at a level below or above the finished load height. If the items enter the palletizer above the finished load height an item or items do not necessarily need to be picked and placed. A programmable device can just as easily slide an item or items into a rough position on the oversized layer support platform positioned at the same or slightly lower elevation as the item infeed elevation. Sliding avoids time consuming pick and place so throughput is improved. Sliding distance is reduced and speed increases if the layer support platform indexes as described earlier. Similarly if an adjacent static platform roughly equal to about half a layer size with a secondary items sweep mechanism capable of transferring already positioned items into the oversized layer build platform, item or items sliding can continue during layer conditioning and deposit increasing rate potential. Another alternative to a static intermediate platform that allows continued partial layer assembly during layer condition and deposit is to use an extended apron where the very short slide strokes combined with an indexing apron creates an assembled layer that indexes into the layer conditioning and deposit zone. Remaining apron is available for additional positioning of items as the already completed layer is conditioned and deposited. During layer deposit when the apron retracts from under the layer being deposited a means must be employed to resist substantial movement of already positioned items that are part of the next layer already positioned on the extended apron. Those items already positioned as part of the next layer on the apron can be held in position resisting the apron sliding motion by a second stop that comes from below or above or by the ledge created by an elevation difference when the indexing apron is slightly below the infeed elevation. An advantage of a stop that comes from below such as a tilting dead plate or a static ledge created by an elevation difference between the infeed and apron elevation is that items can continue to be slid into position over the ledge or tilting dead plate while the apron is being retracted allowing uninterrupted item positioning for higher rate potential. Some of the iterations discussed in this paragraph can occur with concurrent wrapping when the layer is lowered to the load under construction. If the pallet is raised to the load build height then lowered as layers are deposited throughput is further increased because down stacking palletizers are inherently faster due to quicker layer deposits than high infeed palletizers that lower the layer for deposit. Finally, addition of more than one programmable device capable of sliding an item or items will provide further increase in throughput potential.

Individual items or group of items will be picked and placed or slid onto a layer support device in a loose orientation. The loose orientation (also referred to as a rough build or rough finish layer or loosely constructed) enables a much faster palletizing operation over known prior art devices because the robotic arm that pick-and-places or slides the item or items can operate much faster as it does not have to precisely locate the item or items.

During the time that a layer is being loosely constructed on the layer support device concurrent wrapping can occur. When concurrent wrapping is used the wrapper turntable remains at a fixed elevation. If concurrent wrapping is not used, the load build position remains stationary or can be hoisted to the layer support device height in higher speed down stacking high-infeed palletizers.

A pick and place operation by the robot to rough finished position so that motion can be as rapid as possible allowing higher throughput. Because the pick and place device does not need to perform final positioning more items can be handled in a time span compared to other known methods and devices. And, a rough position deposit with adjacent space around items allows rapid use of a bottom support picker for more secure item handling.

In one preferred embodiment of the present invention a robot picks and places items from a fixed infeed elevation. This infeed elevation invariably is at some height that differs from the height of the finish load and depends on the needs of a particular production line. Accordingly, the infeed conveyor, although fixed in vertical elevation, may be either below the height of the finished load or above the finished load.

Individual items or group of items are picked and placed onto a layer support device in a loose orientation. The layer support device is substantially larger than the finished layer after conditioning. The layer support device has the ability to condition the load with layer clamping. The preferred picking device is a gripper that provides support from the bottom of the item allowing very fast movement as the item is contained. Vacuum top picking is an option, but vacuum is less reliable because speeds must be slower to reduce the chance of vacuum grip loss.

Bottom support requires clearance from adjacent previously deposited item on the layer support device so that the bottom support can move out from under the item when deposited.

During the time that a layer is being loosely constructed (oriented, or rough-built) on the layer support device concurrent wrapping can occur on previously deposited layers. Then, known and existing concurrent wrapping technology, which is fully automated, can occur as would be understood by those having ordinary skill in this art. When concurrent wrapping is used the wrapper turntable remains at a fixed elevation. If concurrent wrapping is not used, the load build position remains stationary.

The robot base remains stationary. The vertical and horizontal reach of the arm allows the robot to pick and place items from the fixed infeed elevation to various heights of the layer support device as it moves up always remaining above the height of the load under construction for applications where the infeed elevation is below the height of the finished load. When the in-feed elevation is above the height of the finished load the layer assembly platform and the infeed maintain a similar vertical relationship during item transfer to the layer assembly platform.

The present invention overcomes some limitations of known devices. For example, Yourgalite U.S. Pat. No. 5,005,335 instructs that a set of boxes should be accumulated before they are picked up by a robotic palletizer and transferred to the turntable. This teaches away from the present invention because Yourgalite requires a set of boxes to accumulate and only then can the robotic palletizer transfer the set of boxes to an awaiting pallet on the turntable. Further, Yourgalite does not contemplate or suggest a "compaction" of items as defined in the present invention and, further lacks means for layer queuing, which eliminates the possibility of concurrent wrapping without stopping palletizing.

DRAWING

DESCRIPTION OF THE INVENTION

Possible preferred embodiments will now be described with reference to the drawings and those skilled in the art will understand that alternative configurations and combinations of components may be substituted without subtracting from the invention. Also, in some figures certain components are omitted to more clearly illustrate the invention.

A known device that exemplifies the level of skill and understanding of those in this art includes the article handling device and system as described by Heston in U.S. Pat. No. 6,533,533 issued on 18 Mar. 2003, the entire contents are incorporated by reference as if fully set forth herein.

Figure 1:
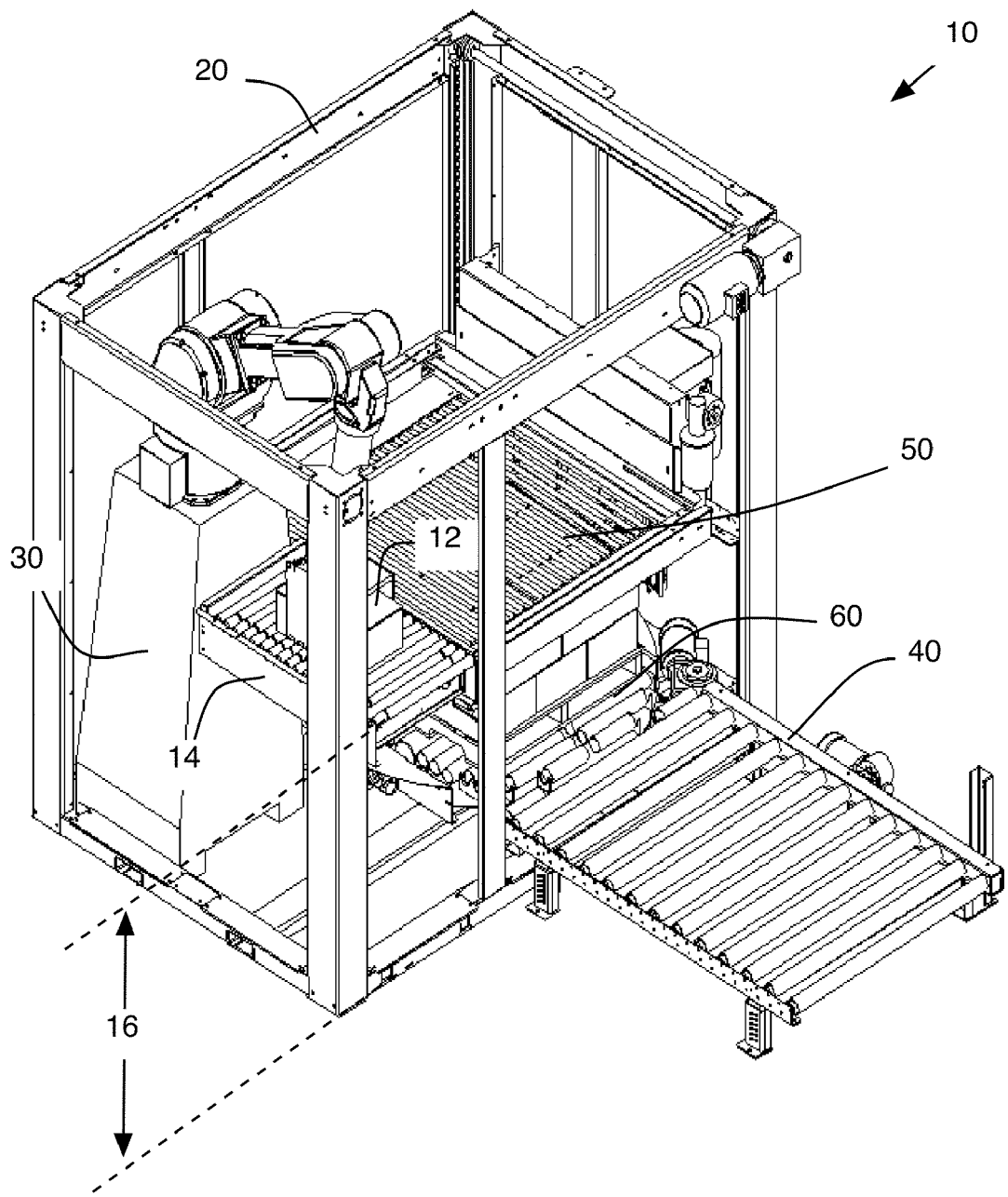
FIG. 1 is an offset front view of a hybrid palletizer including an item handling and stacking system at a first position according to a first preferred embodiment of the present invention.
Figure 2:
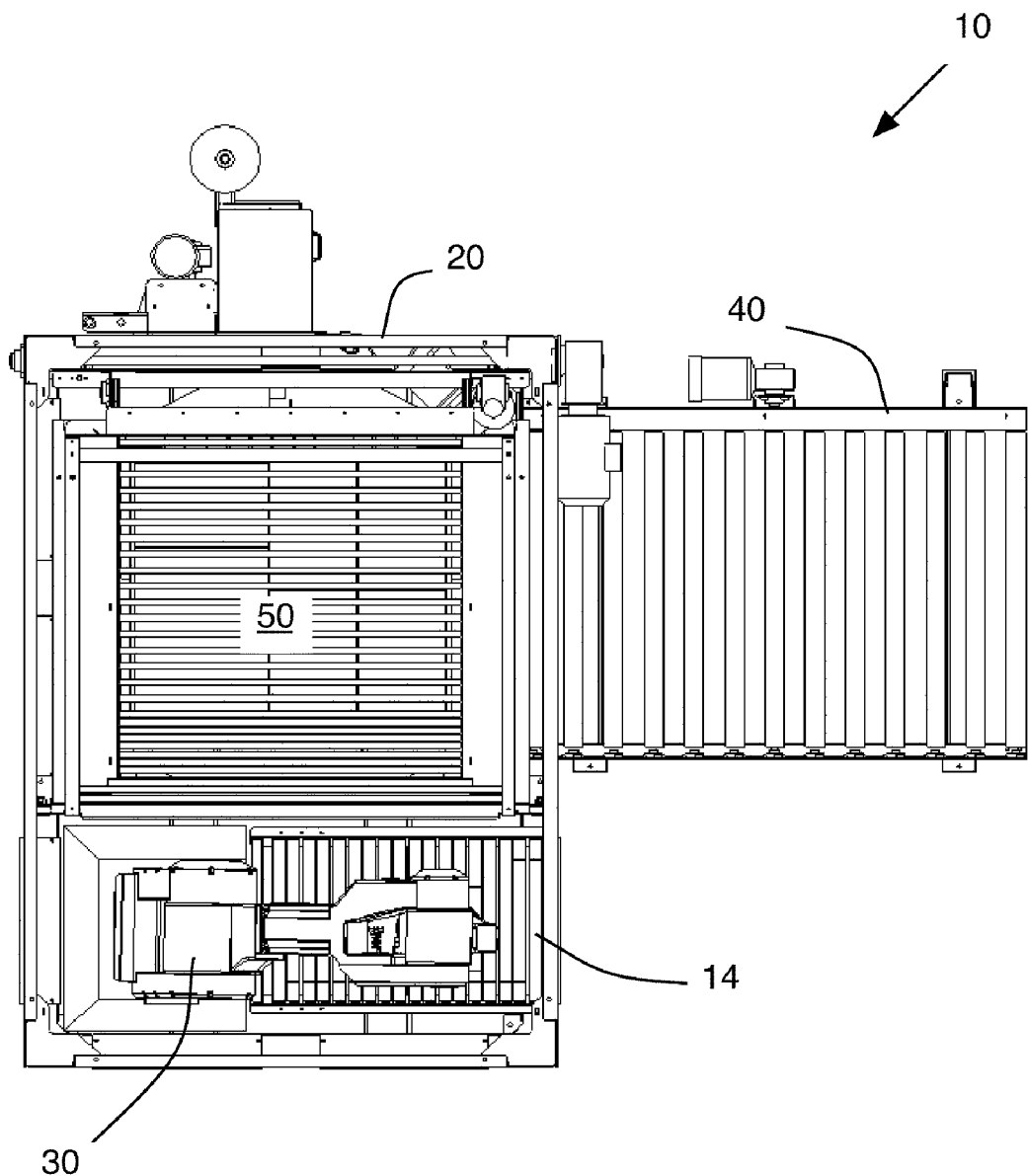
FIG. 2 is a top-view of the hybrid palletizer system of FIG. 1.

FIGS. 1-20 show a first preferred embodiment and related elements of a hybrid palletizer including an item handling and stacking system 10 according to the present invention. FIGS. 1 and 2 provide a general overview of major sub-systems of the hybrid palletizer system 10. Some of the major sub-systems include an infeed system 14, such as a roller conveyer, adapted to transfer items 12 within a range of operation of a robotic pick-and-place device 30. The infeed system locates at a given height relative to the system, such as a first (infeed) height 16. Other sub-systems include an out-feed system 40, a layer queuing device 50 and a stretch-wrapping device 60.

Figure 3:
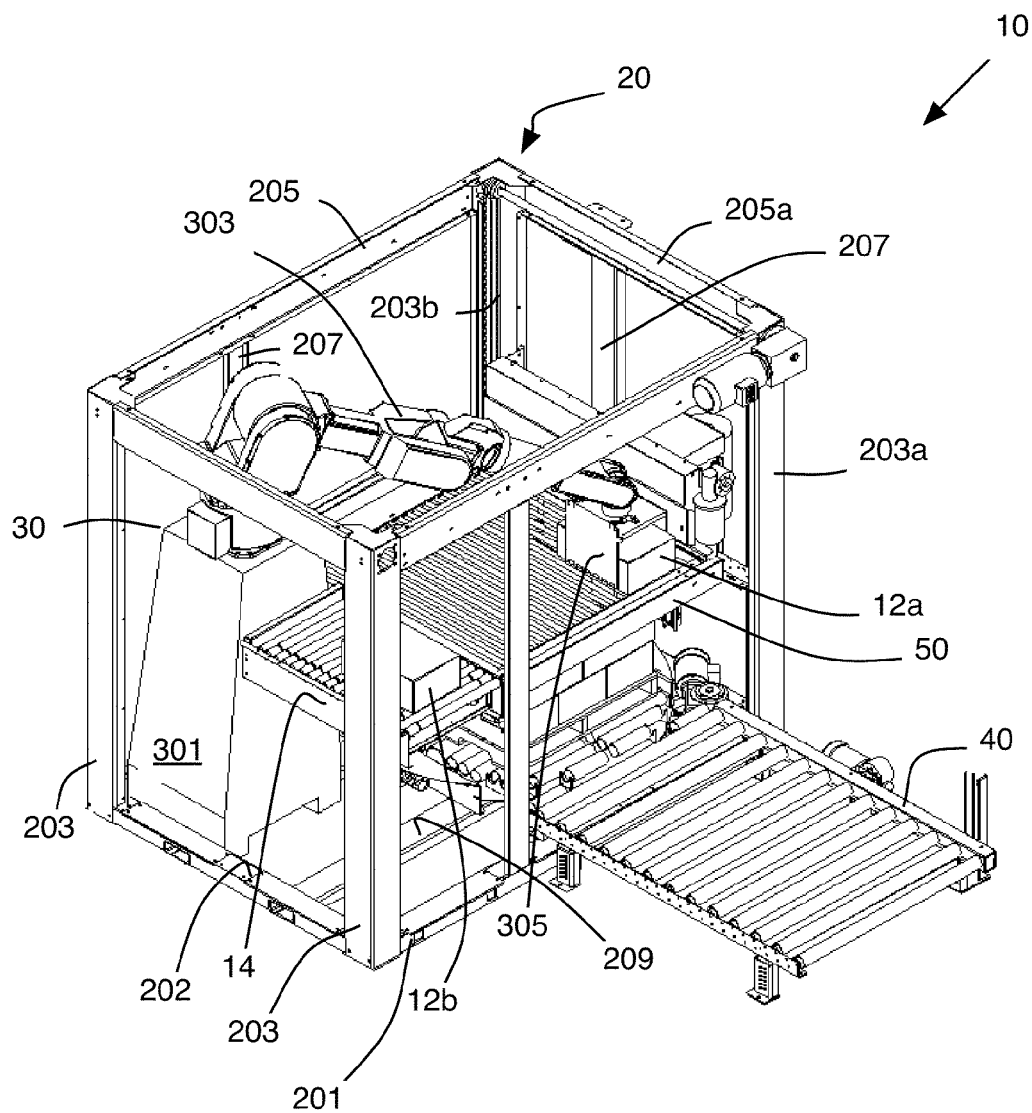
FIG. 3 is an offset front view of the hybrid palletizer system of FIG. 1 at a second position.

Referring generally to FIGS. 1-8a, the first preferred embodiment of an item handling and stacking system 10, adapted to receive at least one item 12 from an infeed system 14 presented a first height 16, includes a frame 20. As FIG. 3 shows, the frame 20 consists of a base 201 consisting of four horizontal members arranged to form a rectilinear box with intermediate members 209 intersecting with and running generally perpendicular to two oppositely positioned horizontal members 202. Additional base support members may be included, as deemed necessary by a particular layout of sub-systems, as would be well understood by those skilled in this art. Extending from the base 201, at four vertical uprights 203 position at the respective four corners of the rectilinear base. The box frame further includes four horizontal beams 205 arranged to mirror the base. And, as would be understood in the art, each frame element couples to the adjacent element to form a rigid structure. The individual frame elements may be coupled by fasteners to enable disassembly and repair, or alternatively, may be permanently coupled by welding or riveting, for example, to provide a more permanent joining of adjacent members.

Figure 4:
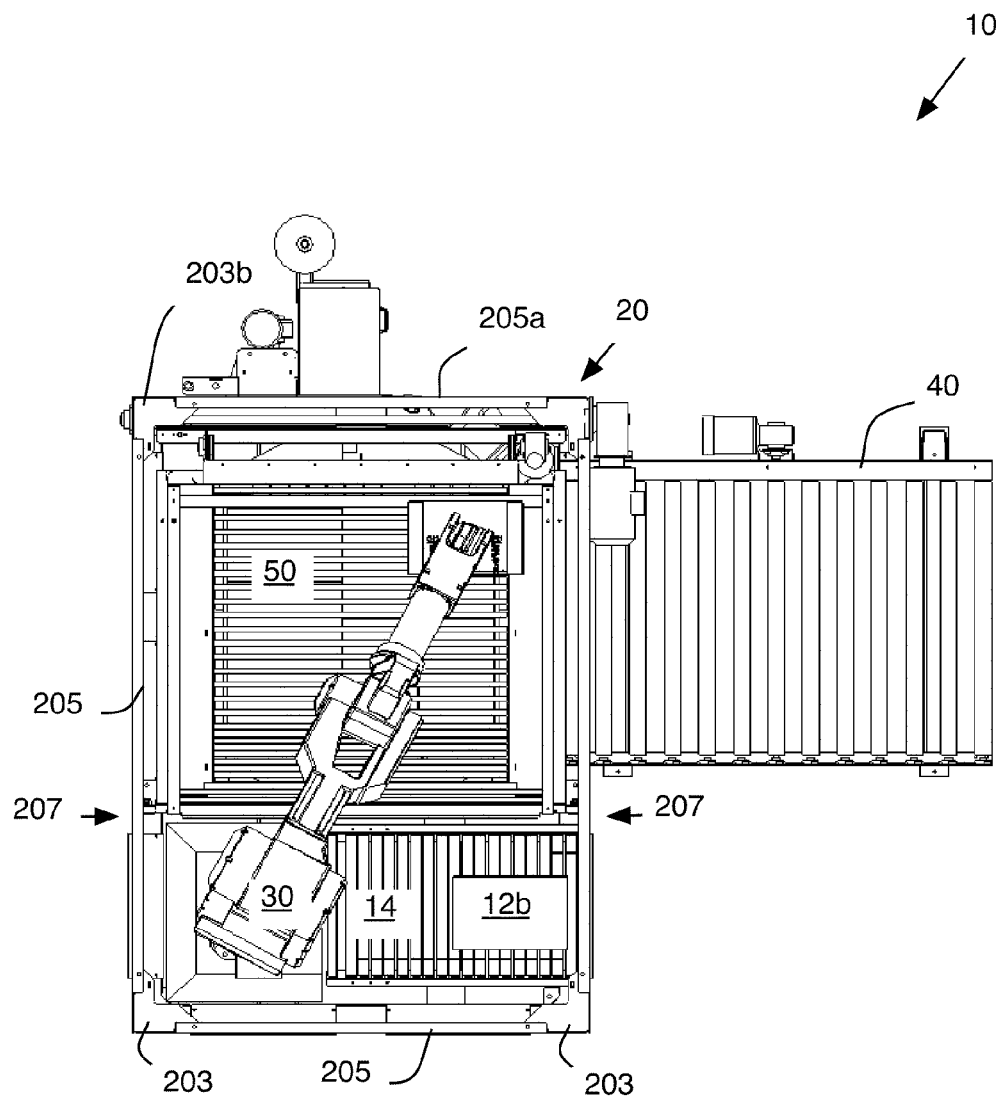
FIG. 4 is a top-view of the system of FIG. 3.

A portion of the frame 20 defines a vertical column of space, which is useful to describe the layout, location, and interaction of certain sub-systems of the present invention. This vertical column of space is best physically defined by a portion of the base 201 and the pair of oppositely positioned intermediate vertical uprights 207 and two, opposite corner vertical uprights 203a and 203b, which are linked by a common horizontal beam 205a, as FIG. 3 shows. Accordingly, the robot 30 and infeed system 14 are adjacent to the vertical column of space despite their physical location within the overall frame structure 20. FIG. 4 further details this juxtaposition of the vertical column defined by a portion of oppositely positioned horizontal beams 205 and the vertical corner uprights 203a and 203b and joining beam 205a and vertical uprights 207. As FIG. 4 shows, the infeed system 14 and robot 30 are adjacent to this vertical column.

In this first preferred embodiment, a layer queuing device 50 locates within the vertical column of space. The layer queuing device is operable to independently and selectively reciprocate vertically between a first position and a second position within the vertical column of space.

Figure 6:
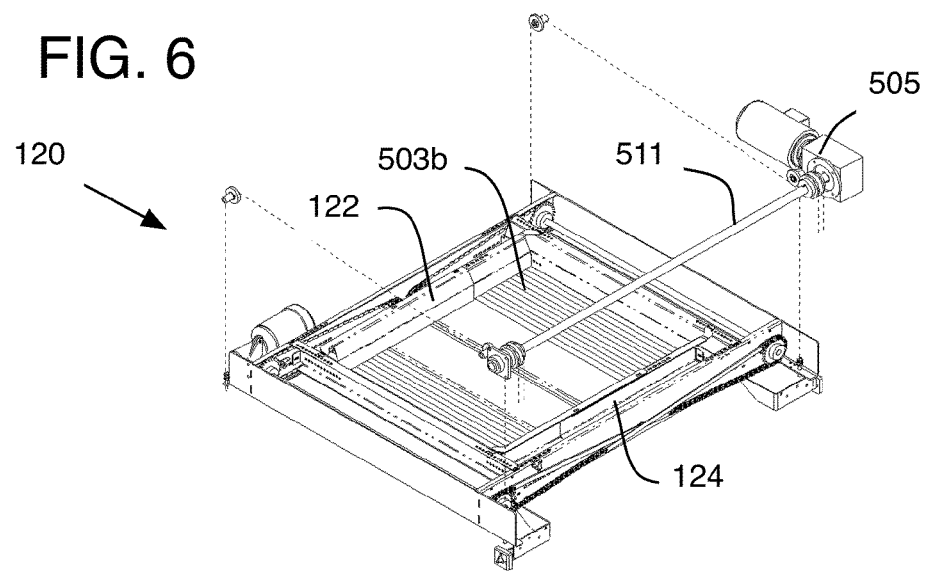
FIG. 6 is a drawing of the chute style layer support device.
Figure 8:
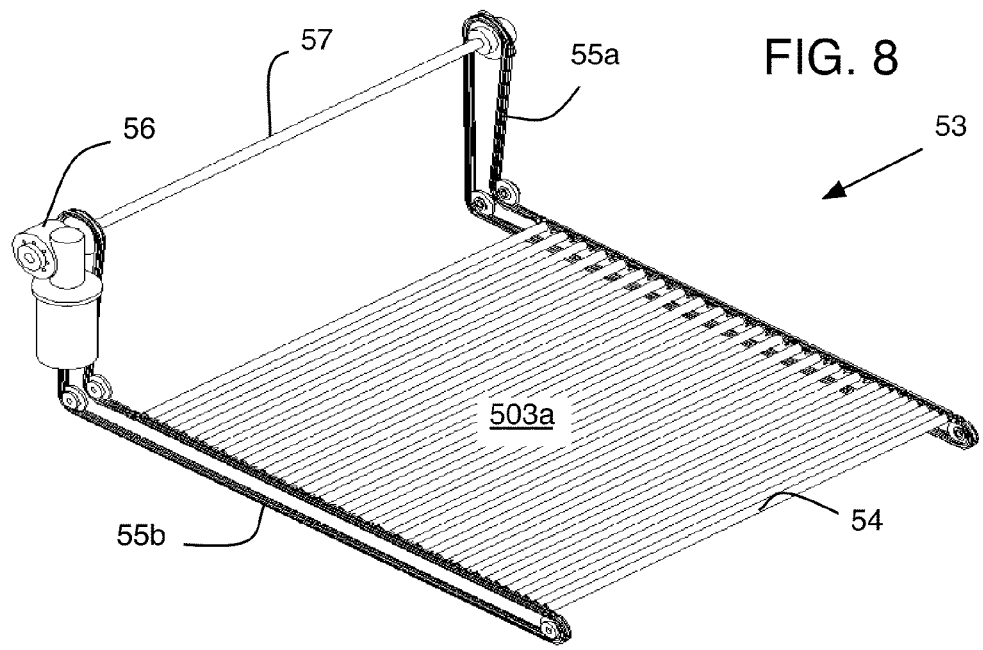
FIG. 8 shows an apron of the system of FIG. 5 in a closed position.
Figure 8A:
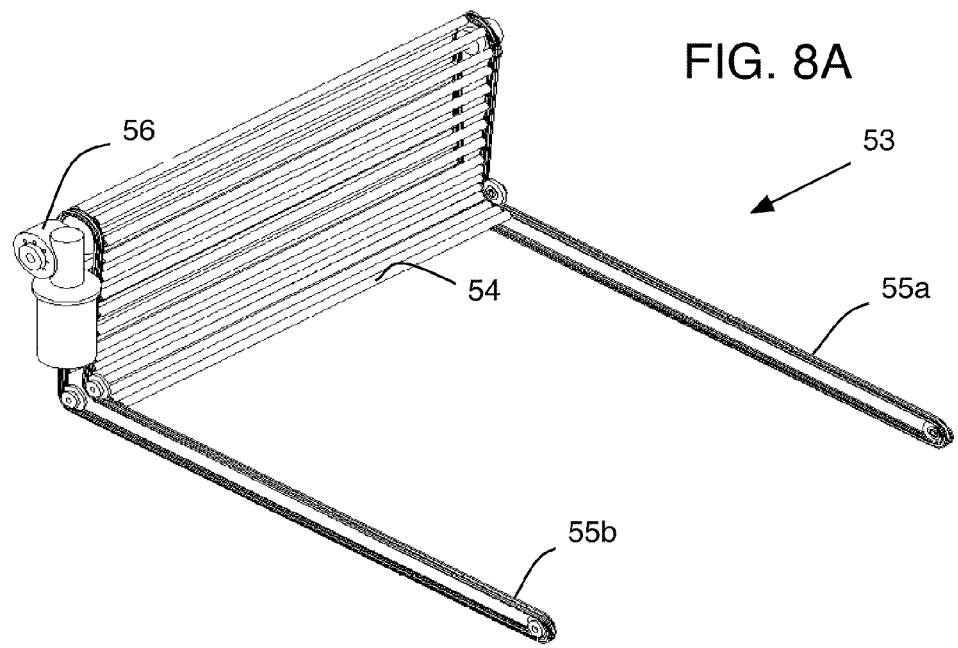
FIG. 8A shows the apron of FIG. 8 in an open position.

The layer queuing device 50, detailed in FIG. 6, for example, consists of an apron 53 (detailed in FIGS. 8 and 8a, for example). The apron comprises a flexible or inflexible support surface, such as the assembly platform 503, and at provides a downward opening so that items constructed into a layer can exit when the support surface is removed.

The apron 53 has a motive device to position the apron in the downward opening and remove the apron from the downward opening to allow items to travel through. In the preferred embodiment the motive force is an electric gear motor that rotates a shaft with two chain loops connected. Rollers or slats create a flexible apron that occupies part of the chain loop roughly equal to the size of the downward facing opening. The shaft rotation causes the two chain loops to move in unison transporting the flexible apron from a position occupying the downward facing opening when items are being accumulated and out of the downward facing opening when items are being deposited.

With specific reference to FIGS. 8 and 8a, the apron 53 includes a roller curtain flexible assembly platform 503. The roller curtain comprises a plurality of linearly aligned roller tubes 54. Each roller tube has a distal and proximal end and each end, respectively, couples to a first and second roller chain 55a and 55b. The assembly platform 503 is selectively operable between an open and a closed position, and can stop at any intermediate position including being operable to selectively index. A gear-motor 56 links to the pair of roller chains 55a and 55b as would be understood in the art, using associated bearings, sprockets, and bushings. A drive shaft 57 with associated bearing sprockets, and bushings at a distal end links the gear motor 56 to the distal roller chain 55b.

Stationary or moveable surfaces immediately above the plane of the flexible apron and positioned in direction of loop movement when provide a stop to retain items from moving with the apron 53 when it is removed from the downward facing opening effectively causing the apron to shear from under the items.

It shall be appreciated by those skilled in the art that the flexible curtain can be made operable to selectively travel horizontally in a single plane in increments. Accordingly, the pick and place robot end effector can place all items in a predetermined position in a first grouping. Then, the flexible curtain can advance a sufficient distance to move the deposited grouping of items over, presenting an open space on the platform 503, thus allowing the robot to place additional items and minimizing robot travel, which would increase the operational speed of the entire palletizing operation.

Figure 29:
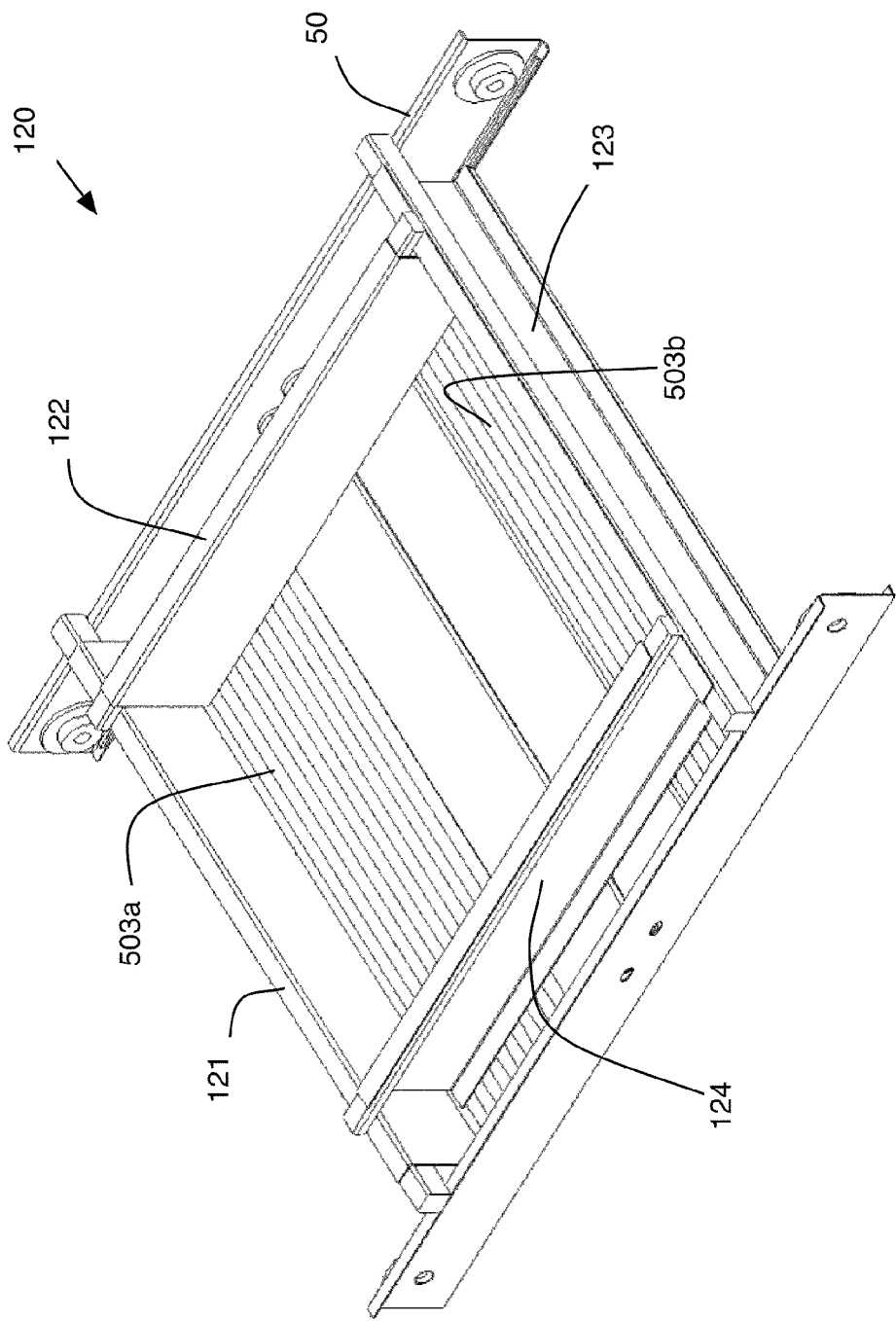
FIG. 29 is an offset front view of a chute guide component of another preferred embodiment of the present invention.
Figure 30:
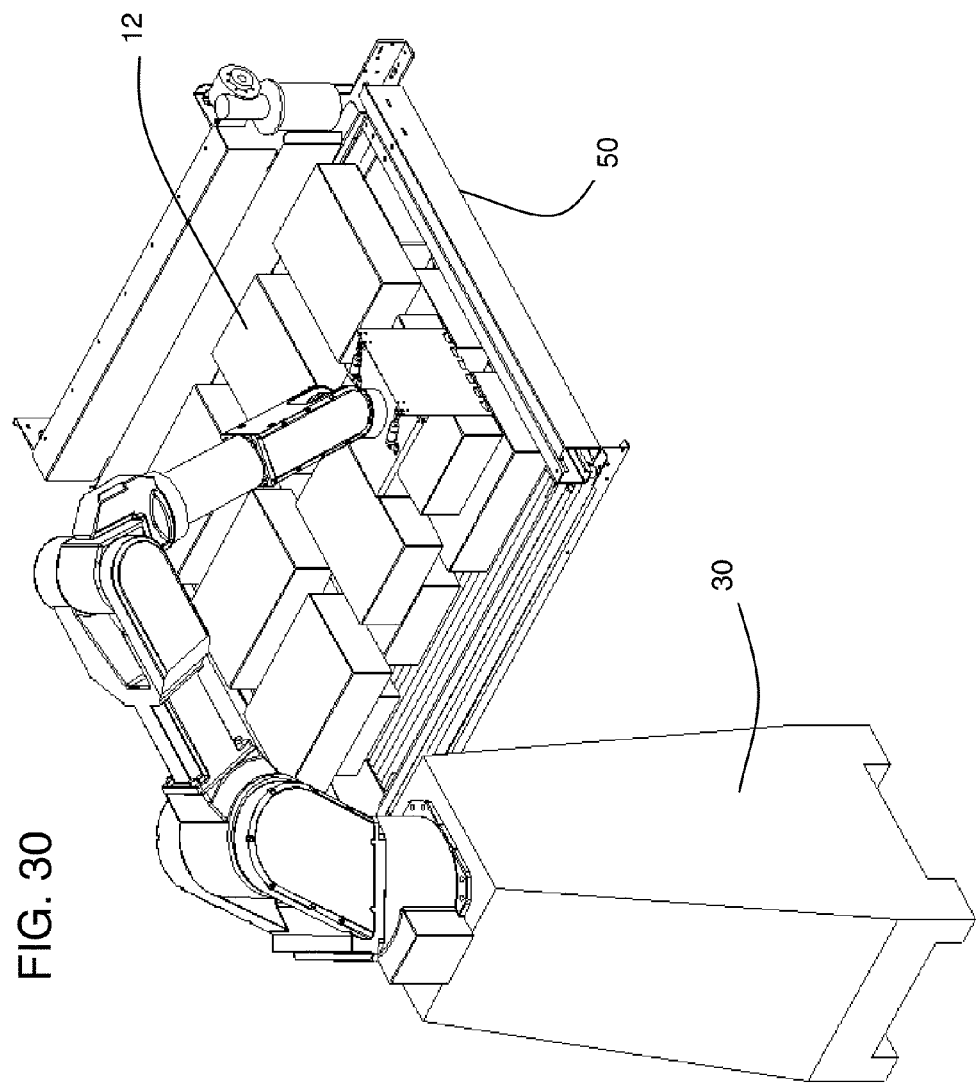
FIG. 30 shows a completed layer being conditioned and the first subsequent group of items being positioned.

Another variation of this first preferred embodiment includes providing a flexible apron comprising at least two roller curtain floors operable to selectively index in the same horizontal plane (as FIG. 29 illustrates, for example), the first roller curtain floor 503a following a first continuously looped path and operable in a clockwise direction and the second roller curtain floor 503b following a second continuously looped path and operable in an anti-clockwise direction.

In the first preferred embodiment, the layer support platform consists of a single chain loop pair. That design effectively urges all items against a backstop on the side the apron travels towards when floor removal occurs. Because the apron is the entire length of the downward facing opening time required to move the floor is twice the time required for two half aprons to move in opposite directions. Furthermore it is desired to position items consistently in all four corners of the completed layer. Some layer patterns have spaced items in the direction of floor removal and if a full-length apron is removed spaced items can collect tightly against the backstop or each other creating a void in the corner of the load.

However, in other contemplated embodiments, other apron designs would work equally well. For example, In one variation, the layer queuing device 50 includes a rigid apron comprising at least one floor panel, and preferably two floor panels, operable to slide horizontally when moving out from under the layer from a closed position to an open position. A rigid apron works equally well as a flexible apron and in some instances has advantages. Some items such as non rigid bags sometimes do not work well with flexible surfaces due to the propensity of the flexible bags surface to conform to the necessary gaps in-between each apron roller or slat that must be used to create a flexible apron. If the bag conforms to the gaps then removal of a flexible apron can damage or tear the bag.

Mechanically, rigid aprons operate substantially the same as a flexible apron with the exception that flexible aprons can transition to vertically travel as the apron rollers or slats move from the horizontal downward facing opening allowing a smaller machine. Inflexible apron designs require horizontal space at least equal to the downward facing opening when a single rigid or two panel bi-parting apron is used resulting in a larger machine.

An apron system when closed can create a layer support platform and when layer deposit occurs by opening the downward facing opening. Bi-parting apron designs move half the apron, each half moves in opposite directions and is, therefore, twice as fast which allows higher rates and items that have gaps in the direction of apron removal are pulled towards each side maintaining the desired positioning of items in each corner of the load.

Figure 6A:
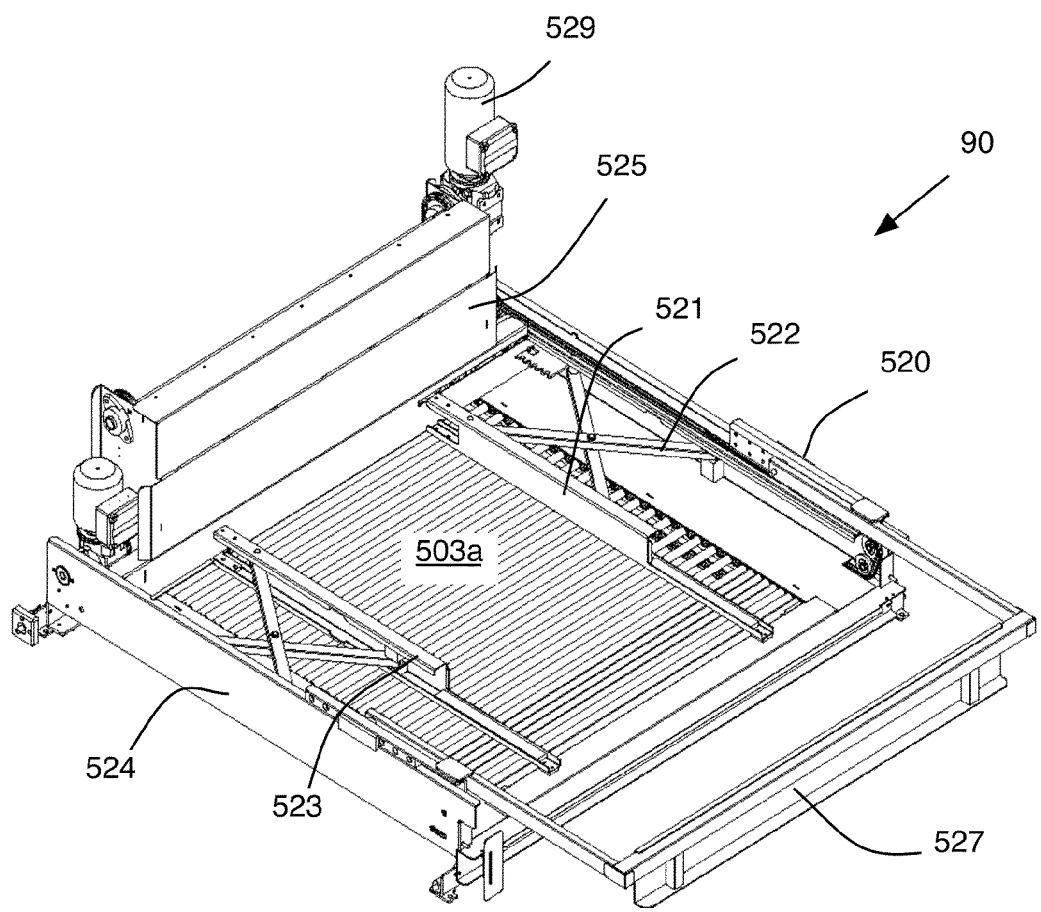
FIG. 6A is the layer support device in FIG. 5 with the layer conditioning clamps in the X direction extended for clamping.

The layer queuing device 50 can be stationary occupying the top of the vertical column of space with the pallet raised to have layers deposited then lower with each subsequent layer deposit until the load is completed. Or, it can position at the top of the vertical column of space when receiving items then descend to the load under construction for layer deposit returning to receive subsequent layers or vertically travel in the vertical column of space remaining above the height of the load being constructed and receiving items at different elevations. Layer queuing devices that travel vertically are effectively platforms that are attached to hoist devices for which there are many known designs. In the preferred embodiment, as detailed in FIG. 6A for example, a gear motor 529 is attached to a driven shaft and associated sprockets and connecting drive chains. Each sprocket drives a chain length with one end connected to each corner of the layer queuing device. Forward and reverse rotation of the shaft driven by the gear motor causes the chain lengths to raise and lower the layer queuing platform including the assembly platform 50 and apron 503. The identical construction can be used to raise and lower a pallet when the layer assembly queuing device remains stationary at the top of the vertical column of space.

The layer queuing device includes a frame structure 501 (of FIGS. 5 and 6A, for example) sized to fit within the frame 20 and includes accommodation for the drive motor 529, at least one drive shaft, and associated components.

As FIGS. 1-5, 7, and 9 show, the layer queuing device 50 includes a layer assembly platform 503 where items 12 are placed for layer assembly and the layer assembly platform, being part of the layer queuing device, moves vertically in the vertical column. Thus, the assembly platform's location defines a selectively adjustable layer-assembly height so as a pallet is built with multiple layers, the build platform moves upward to always stay above the last build-layer positioned on the pallet. Necessarily, the layer-assembly height is always intermediate to the first and second positions representing the range of vertical movement of the layer queuing device within the frame 20.

The layer queuing device 50 further includes a compression mechanism 90 operable to include relative movement in at least two directions in a single plane. In this embodiment, the compression mechanism 90 includes a first x-direction arm 521 and a second, oppositely disposed x-direction arm 523, and a first y-direction barrier 525 arranged generally perpendicular to the first x-direction arm and cooperating with both arms to define a generally rectilinear space. Each respective x-direction movable arm 521 and 523 includes an associated link mechanism consisting of a pair of cross-linked members 522 coupled at a proximal end to the associated arm 521 523 and coupled to a motivating means, such as a drive chain or pulley, at their respective distal end. A common, central link pin enables each cross link arm to rotate relative to the cooperating arm, operating much like a scissors and thus enabling the x-direction arm 521 or 523 to move evenly and remain parallel to its corresponding portion of the rectilinear space. A single drive motor (529 is the motor that moves the flexible apron) operable in forward or reverse, couples to each x-direction arm by drive shafts, pulleys, sprockets, bushings and the like, as well-understood in the art. Thus, the single motor, causes both x-direction arms to simultaneously move inward or, selectively, outward to compress items on the platform 503, as required.

In an alternate preferred embodiment, the first y-direction arm 525 is a rigid barrier and a second y-direction arm 527 is operable to move inwards and outwards, and arranges generally perpendicular to the x-direction arms. Arm 527 is a single y-direction conditioning clamp extended to a position, this position, in certain embodiments would interfere with the robot's movement.

Figure 9:
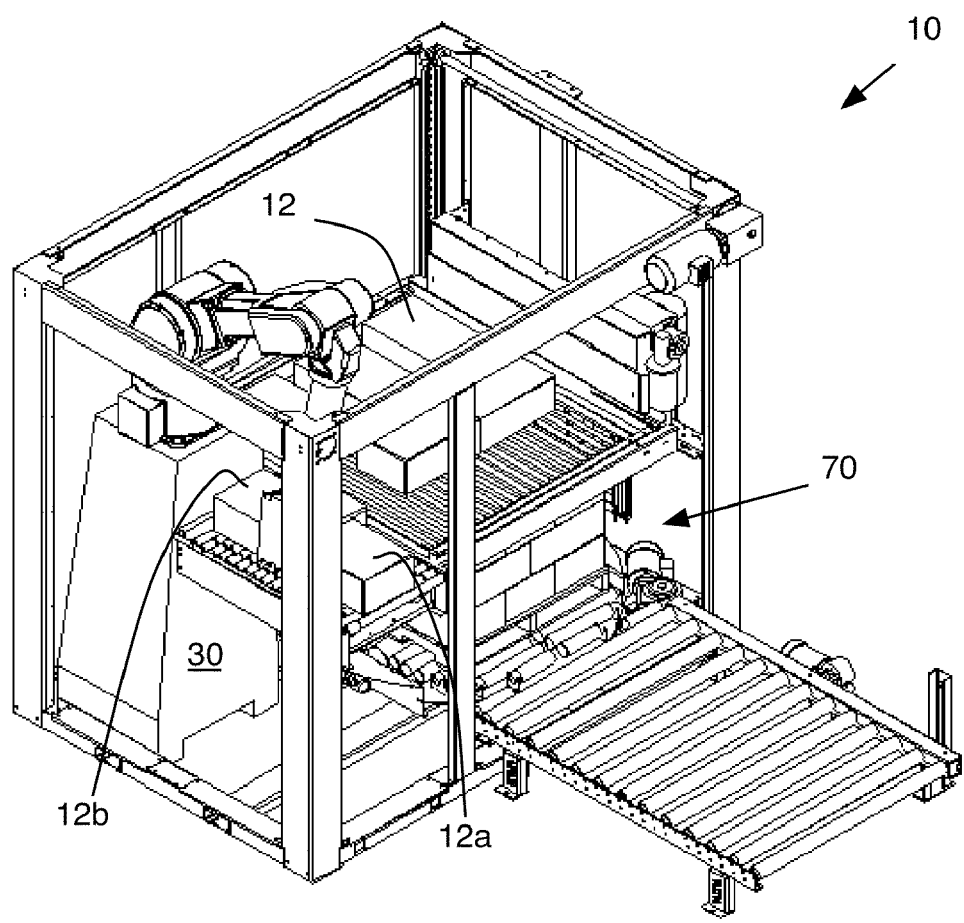
FIG. 9 is an offset frontal view of the embodiment of FIG. 1 in a fourth position with the gripper shown picking two items.
Figure 10:
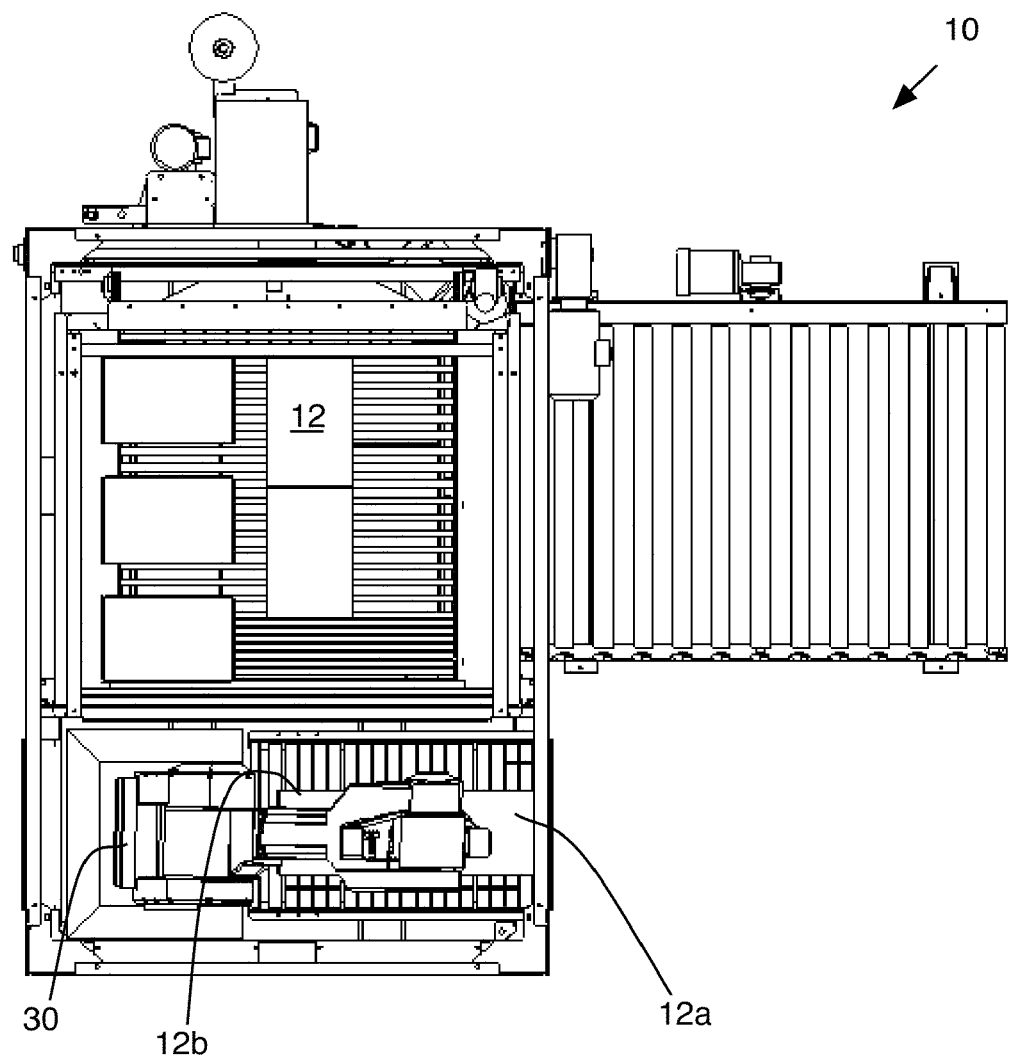
FIG. 10 is a top view of the embodiment of FIG. 9.
Figure 27:
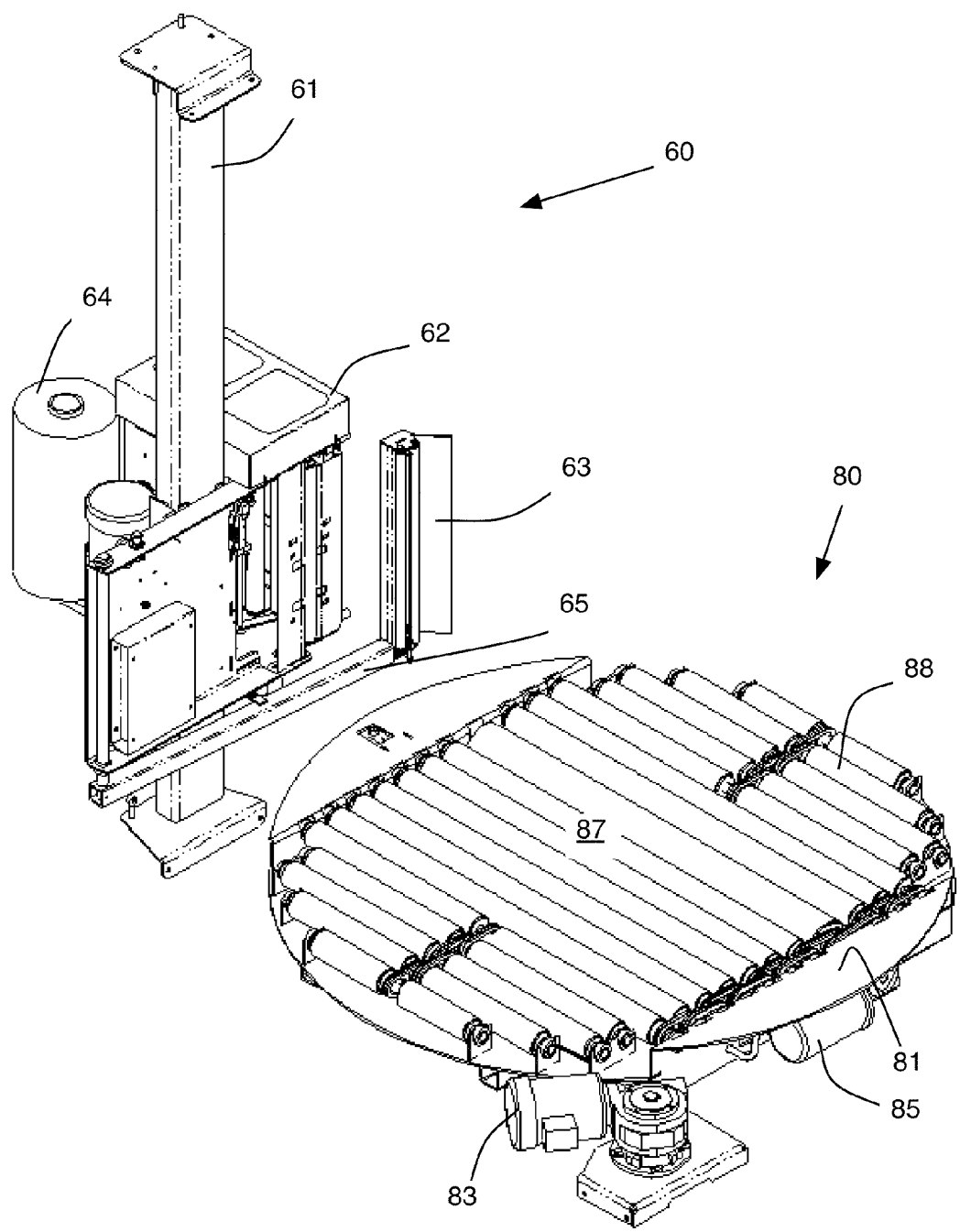
FIG. 27 illustrates a stretch-wrap device according to one embodiment of the present invention.

Further, the frame 20 includes a pallet-build area located within the vertical column and under the layer queuing device (as shown by lead-arrow 70 in FIG. 9, for example). FIG. 27 details a turntable assembly 80 contemplated by this first preferred embodiment, arranged in the pallet build area 70 and adapted to receive layers of items from the layer queuing device, and a stretch wrapping device 60 comprising a means for automatic wrap start and wrap cut after wrapping completion.

With particular reference to FIG. 27, and as generally shown in FIGS. 1-5, 7 and 9, there is a load supporting turntable 80 positioned at the bottom of the vertical column of space supported by a slewing ring bearing. A gear motor 83 and chain loop assembly rotates the turntable 81. Rotation occurs when there is an adequate vertical stack of items roughly equal to the film width. Rotation also occurs while the layer queuing device is being filled with items and returns the turntable to a known position prior to deposit of the next completed layer. The turntable has a powered roller 88 driven top deck that supports the pallet and load of items under construction. The powered roller 88 is motivated in either a forward or a reverse direction by a gear motor 85. The roller deck 87 provides transport means to move empty pallets into position and transfer completed loads off the turntable.

The stretch wrapping mechanism 60 disposes adjacent to the turntable assembly 80. Adjacent to the turntable 81 is a mast 61 that has a hoist mechanism and film dispensing head and film cutting arm 63 with a hot wire to cut film vertically throughout the vertical column of space a partial or completed load occupies when on the turntable. A hoist motor 64 raises and lowers the film dispensing head assembly 62. The film dispensing head has rollers capable of metering out film to wrap the load while the load is being constructed. The rollers are driven by a motor whose speed is manipulated to coordinate film dispensing rate to the needs of the load as it rotated on the turntable. The film dispensing head also travels vertically to spiral wrap the load with varying amounts of film overlap.

Automatic film dispensing and film wrap completion requires the means to start the film by attaching the film tail to the turntable or load so that turntable rotation pulls film from the dispenser until rotation begins to wrap the load after which the film initially contacting the load continues to pull the film from the dispenser whenever rotation occurs until the load is wrapped to the desired amount. In the preferred embodiment the film is not attached to the turntable, but is blown onto the empty pallet or one of the first layer of items then subsequent layers are deposited to secure the film to the load. Another method is to use a clamp on the turntable to grip the film tail.

After the desired load wrap sequence occurs that may wrap the entire load of some part of the load the film must be cut creating a tail for the next load sequence. In the preferred embodiment, an arm with a hot wire cutter 63 is a single hot wire cutter supported on a vertical extension of arm 65 actuated to swing into the film in-between the dispenser and the load that cuts the film.

In this first preferred embodiment, the stretch wrapping system includes the turntable 80 positions in the vertical column of space and remains in a fixed vertical location within the column but is adapted to selectively rotate a pallet or a layer of items. (It would be understood in the art that the pallet layer would likely be placed on a pallet, however, other embodiments contemplate stacking a layer of items directly on a platform or on the turntable, or slidable sheet).

The stretch-wrapping device 60 includes a conventional stretch wrappings system such as the Q-series automatic system available from Lantech, Inc. of Louisville Ky., USA. Modifications to such a conventional system include sensors and machine-executable operating instructions and software programming to enable the stretch-wrapping device 60 to wrap one or more layers (each layer comprising one or more items arranged in x and y rows in an a single plane) while the pick-and-place robot continues to place individual items or groups of items on the layer queuing device.

Although the turn-table 80 and stretch-wrapping device 60 are discussed relative to the first preferred embodiment, it will be appreciated by those skilled in the art that a similar stretch wrapping mechanism could be adapted for use with other preferred embodiments as described herein.

Figure 19:
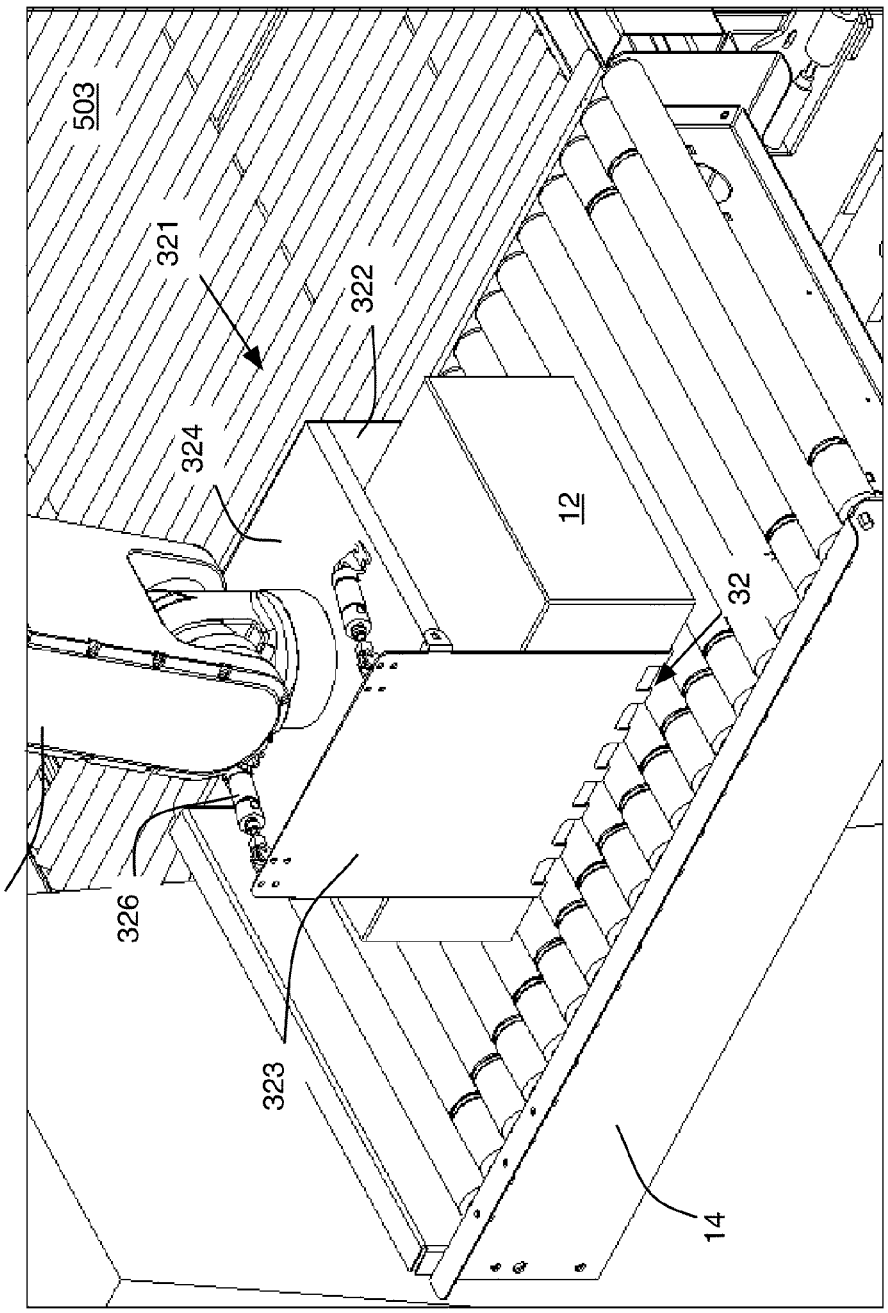
FIG. 19 is a detailed view of a pick and place end-effector having an under-side-support gripping element.
Figure 20:
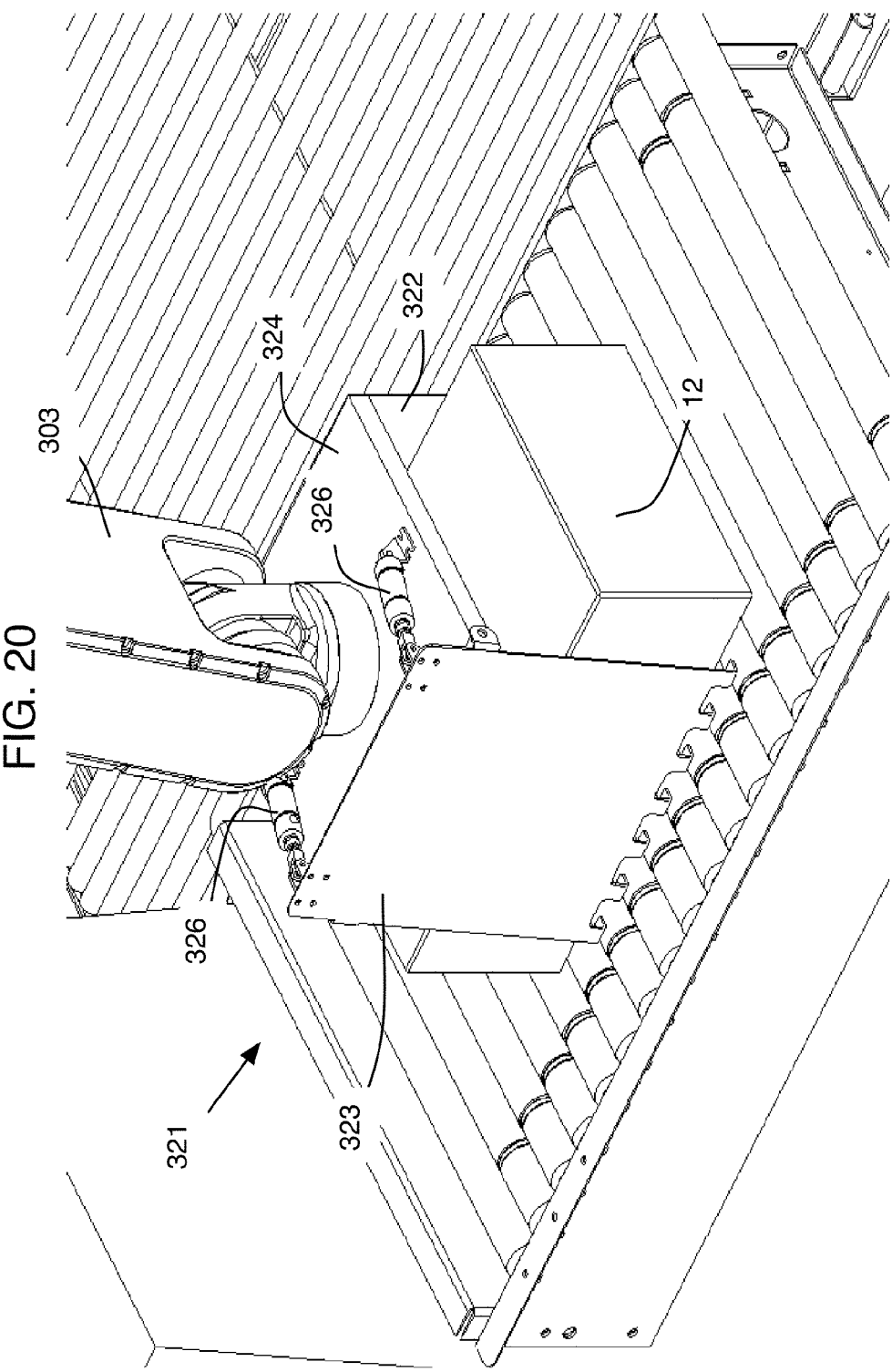
FIG. 20 shows the end-effector of FIG. 19 in another position.

The first preferred embodiment of the present invention includes a robot 30. The robot includes a stationary base 301 and an articulating arm assembly 303 adapted to provide 90-degrees of rotation in a three-coordinate space. At a distal end of the arm, an end-effector enables transfer of the items 12 from the infeed system 14 to the layer queuing device 50. One suitable end-effector includes a gripping element 321 as FIGS. 19 and 20 show, for example. This gripping element includes a top portion 324 coupled to the distal end of the arm 303 and a rigid perpendicular rear-wall 322. An oppositely positioned front wall 323 hingeably couples to the top portion at its proximal end. The front wall includes claws 32 at its distal end. The claws extend generally perpendicular to this front gripping wall 323. A pair of cylinders 326 actuate between an open and a closed position, which enables the claws to manipulate under an item 12 on the infeed conveyor 14, grip (by closing the actuating cylinders) and pick up the item when the robot arm 303 moves upward.

The gripping element 321 arranges at the distal end of the arm 303 of the robot 30 and is operable to pick and place the at least one item 12 from the infeed system 14 and transfer the at least one item to a predetermined location on the layer queuing device 50. The gripping element further includes a bottom support picker 323. Thus, the gripping element positions adjacent to the item on the infeed conveyor in a first, open position and lowers to surround the item and close upon it. The picker 323 positions under the item.

In nearly all instances any method of item picking that does not support some portion of the bottom of the item is inferior to a device capable of bottom support because securing the item for pick and place transport is compromised. Bottom support overcomes deficiencies of top vacuum picking because the variable of vacuum seal is eliminated. Similarly clamping is not always reliable due to variations of item integrity.

Top picking vacuum devices are very common, but for many products such picking is impractical due to the item top construction being unsuitable for vacuum sealing required for picking. Many other items with some variable porosity of the top surface such as cardboard cases often require slower movements than might be possible because vacuum seal to the case top is inconsistent.

Item clamping for pick and place is another common method of item gripping. Many items are suitable for clamp picking, but the space occupied buy the clamp surface on the item side creates voids in the finished load unless secondary time consuming item bumping occurs.

Building a loose layer on a layer support apron rather than directly on the load provides the option for the preferred embodiment of bottom support item picking because there is adequate clearance for the bottom support element of the picking device to disengage from the item when it is deposited.

Bottom support advantages are realized with only a minimal amount of bottom support as dramatic deformity of the item must occur before picker support capabilities are compromised. Furthermore only one side bottom support achieves nearly the same reliability as two sided bottom support picking as the item cannot slide out the bottom of the picker in either case without substantial deformation of the picked item.

The bottom support aspect of the gripper can engage by pivoting or lineal motion for which there are many methods of design. One or both sides of the picker can pivot or travel laterally to clamp and engage the item or items bottom and release the item or items. In the simplest design there is one fixed side and another side that pivots to open and close actuated by a pneumatic cylinder. Nearly the same device can be designed so that one side is slid horizontally to clamp and position the bottom support slide of the picker to the item or items.

In another variation of the first preferred embodiment, the layer queuing device 50 includes an oversized layer assembly platform and a compression mechanism 90. Thus, when used with the gripping element 321, this embodiment enables rapid placement of a layer of items on the platform 503. Although the robot places each item of a given layer in a predetermined position, the positioning can be less precise (so called "rough or loose positioning") and, therefore, the robot can move the arm more rapidly. Because the gripping element 321 requires clearance to release the grip of the item, the layer of items necessarily needs to be placed with space between each item picked or group of items picked on a given layer. In the prior art where items are placed directly on a load, such gripping of items required a subsequent bump or nudge into final position before the robot could return to the infeed conveyor. However, in this embodiment, the robot need only loose or rough position the items. Final positioning of all items of a layer is done at one time by the compression mechanism 90 on the oversized build platform 503.

Accordingly, the apron comprises an oversized layer assembly platform 503*a* having an at least two-axis compression mechanism 90 operable to position the at least one item on the oversized layer assembly platform from a first loosely placed position to a second compressed position, the second compressed position approximating a finished layer dimension when deposited on a pallet.

It will be appreciated that the various variations of this first embodiment may be combined in different combinations. Importantly, this first embodiment with its variations can be adapted for many different palletizing operations wherein the infeed system is in a fixed position relative to the vertical column. In certain palletizing operations, the infeed system may present items at a low-feed height, while other systems may present items at a high-feed height. This first embodiment can readily adapt to any given infeed system height because the robot transfers the items from the infeed system to the build platform and the infeed height and variable build height need not be at the same elevation.

In certain installations, such as an operation that presents an infeed system a high-infeed position, a sliding transfer of items from an infeed conveyor 14 to the palletizer may be desired. Accordingly, a specialized end-effector as FIGS. 15-18 illustrate may be preferred. Accordingly, the robot 30 includes an end effector 320 that is adapted to slide items from the infeed conveyor to the vertical transport platform, the end effector comprising a variable sized push bar 333, the push bar comprising a positionable hand 335, the hand being operable from 0-degrees rotation to 90-degrees rotation relative to the push bar whereby a rotation of 0-degrees enables the hand to be folded on the push bar for a cupped position facilitating item rotation in cooperation with robot gripper rotation capability and whereby 90-degrees rotation enables the hand and push bar to cooperatively extend the effective length of the push bar. A pneumatic strut 337, and associated controllers and programming sequences can be used to position the hand 335 in the desired position as required for a particular palletizing operation.

Figure 15:
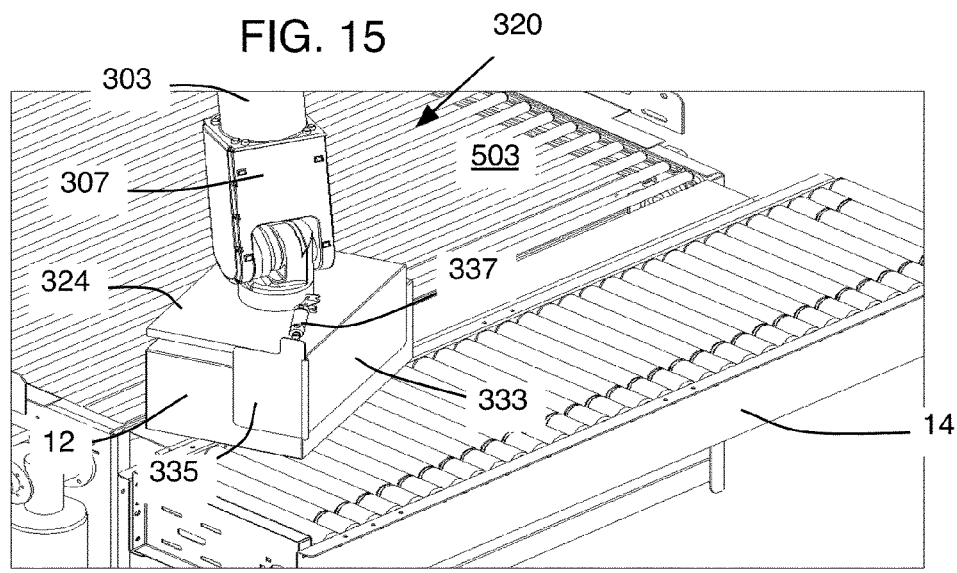
FIG. 15 is a detailed view of a sliding end effector in a first position according to a preferred embodiment of the present invention.
Figure 16:
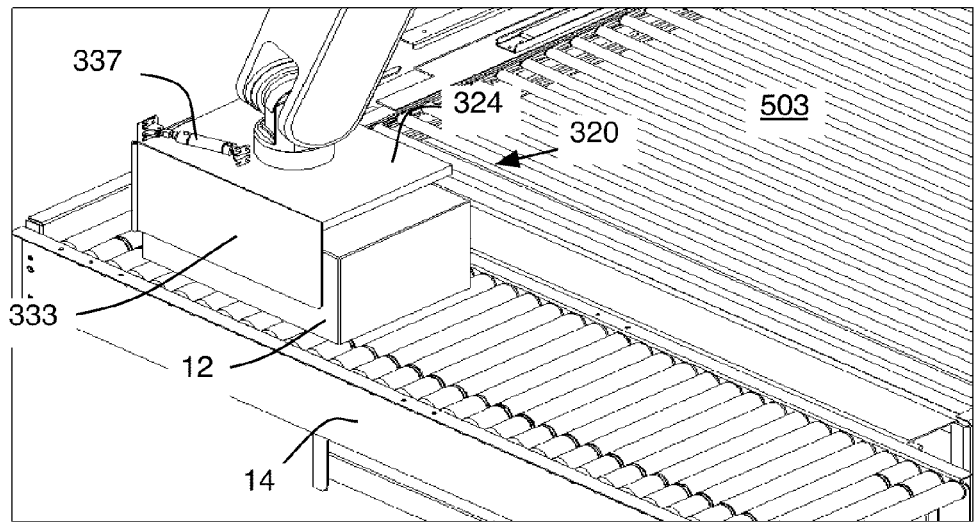
FIG. 16 shows a second position of the end-effector of FIG. 15.
Figure 17:
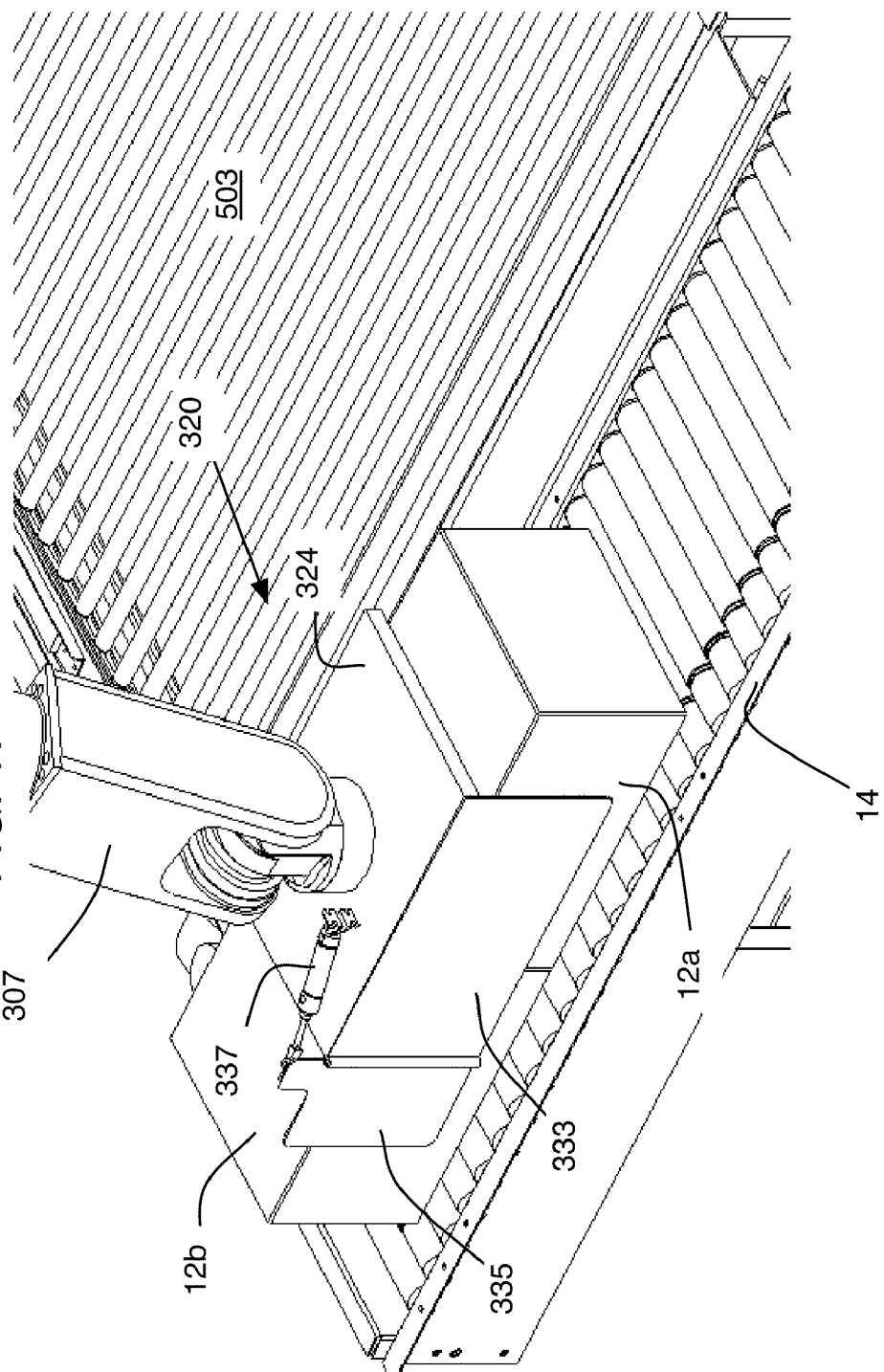
FIG. 17 shows a third position of the end-effector of FIG. 15.
Figure 18:
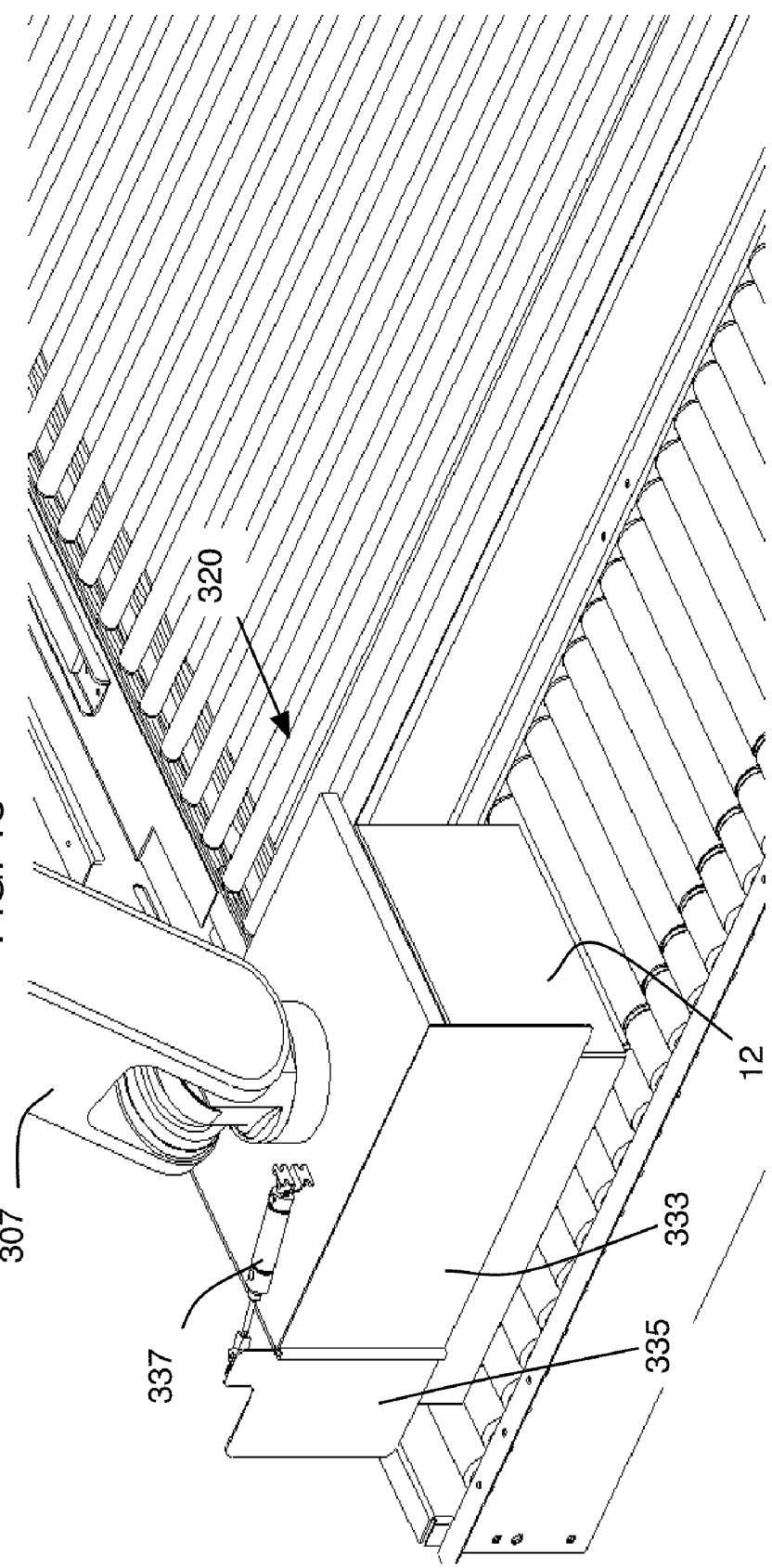
FIG. 18 shows a fourth position of the end-effector of FIG. 15.

The robotic end effector 320 is further operable to rotate the at least one item 90-degrees from a first orientation to a second orientation (FIG. 15). Additionally, the robot is operable to transfer a plurality of items from the infeed conveyor to the layer queuing device (FIG. 17).

And although not shown in FIGS. 1-20, the end effector can be programmed to deposit multiple layers on the layer queuing device before the being deposited on the pallet. Thus, the layer queuing device adapts to receive the plurality of items to form multiple layers whereby fewer layer deposit cycles occur between the layer queuing device and the oversized layer assembly platform thereby increasing item throughput speed. For example, Figure illustrates a representative double stand and double stack indexing operation, the technique and operation of which is well suited to this first preferred embodiment.

The present invention contemplates a method using a hybrid palletizer according to the first preferred embodiment. FIGS. 1-14 show various stages of this first contemplated method using a hybrid palletizer of the present invention. For example, FIGS. 1 and 2 show a first item 12 arriving on an infeed system 14. The infeed system includes a transfer device, such as a roller conveyor, at a given infeed height 16. The transfer device, illustrated as a roller conveyor, can be any type of infeed device including a free-rolling roller conveyor, a mechanized roller conveyor, a belt, or a flat surface for sliding items, for example. Appropriate stop bars or other mechanical devices and sensors may be included to locate an incoming item at a particular location on the infeed device, as would be well understood by those skilled in the art. Also, the infeed height 16 can vary depending on the particular application of use of the palletizer. As illustrated in FIGS. 1-14, the infeed height is at an intermediate height, higher than the pallet build height represented by the turntable 70, and lower than the top of the frame structure 20. However, a high-infeed height (above or near the top portion of the frame), or alternatively, a low-infeed height (at or near the floor or turntable height) would work as well for this first method. Variations to this method based on the location of the infeed conveyor are discussed subsequently. However, for the first embodiment of the preferred method, an intermediate infeed-height, as depicted in FIGS. 1-14, will be discussed.

FIGS. 1 and 2 show a first item 12 at the infeed system 14 conveyor. The robot 30 picks the item using its end-effector, here a gripping element 321 with picker fingers 32 arranged under a portion of the item. An empty platform 503 consisting of a flexible apron comprising a roller curtain of layer queuing device 50 awaits the first item. Below the layer queuing device, two previous layers of items already are completed on a pallet resting on the turntable 70. It will be understood that the first two layers positioned on the pallet as depicted in the various figures would have been placed on the pallet according to this method in a previous iteration.

FIGS. 3 and 4 show the transfer or placement of the first item 12 from the infeed system 14 to the build platform 503 in first, pre-determined position. This first position, as illustrated, is in the front right-hand corner of the platform, however any number of layer build patterns is contemplated and this method should not be limited to the literal version depicted in the Figures. As this first item 12a is being placed, a second item 12b arrives at the infeed system.

Figure 5:
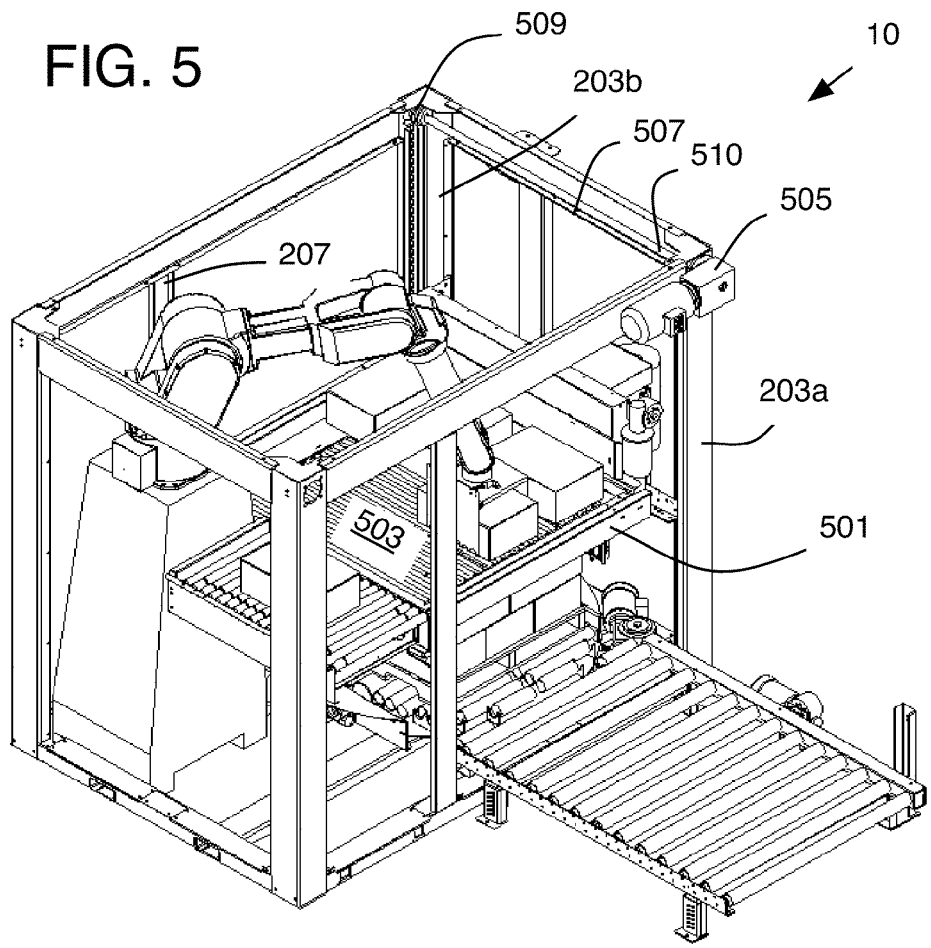
FIG. 5 is an offset front view of the hybrid palletizer system of FIG. 1 at a third position.
Figure 7:
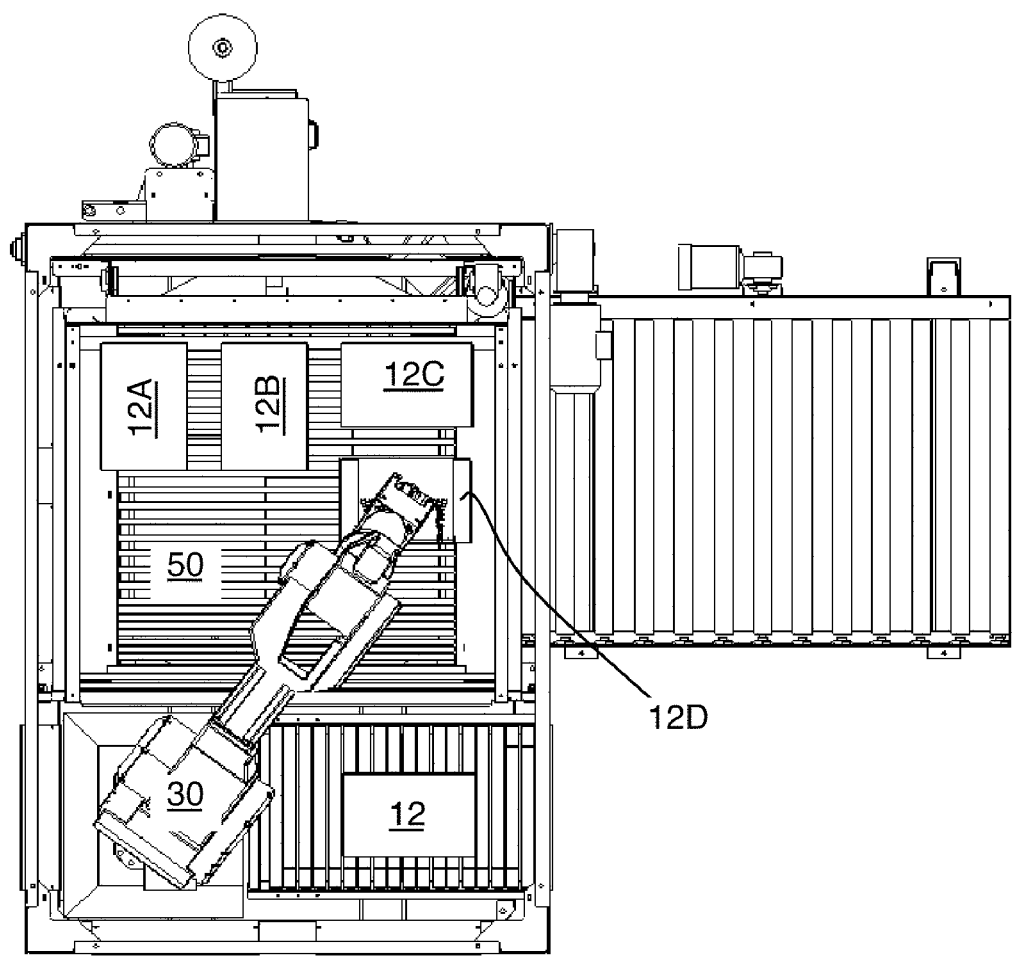
FIG. 7 is a top view of the system of FIG. 5.

FIGS. 5 and 7 illustrate a layer under construction. Each item on the platform 503 is located in a predetermined position according to a layer build pattern. However, each item is placed in a rough or loose position. This allows the robot to travel more quickly and transfer more items to the layer queuing device 50. However, this rough build position results in a layer that is oversized when compared to the finished build layer required to fit on the pallet below. Accordingly, this layer will need subsequent conditioning prior to deposit on the pallet.

Figure 11:
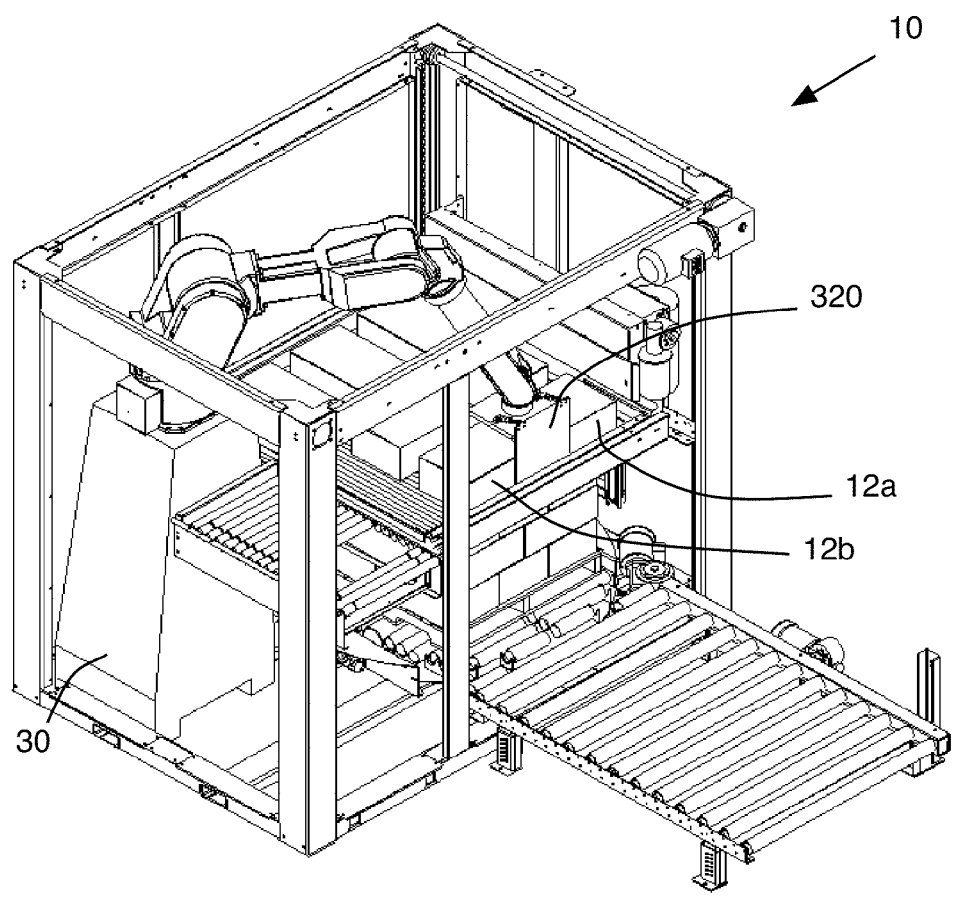
FIG. 11 is an offset frontal view of the embodiment of FIG. 1 in a fifth position and showing two items being roughly positioned.
Figure 12:
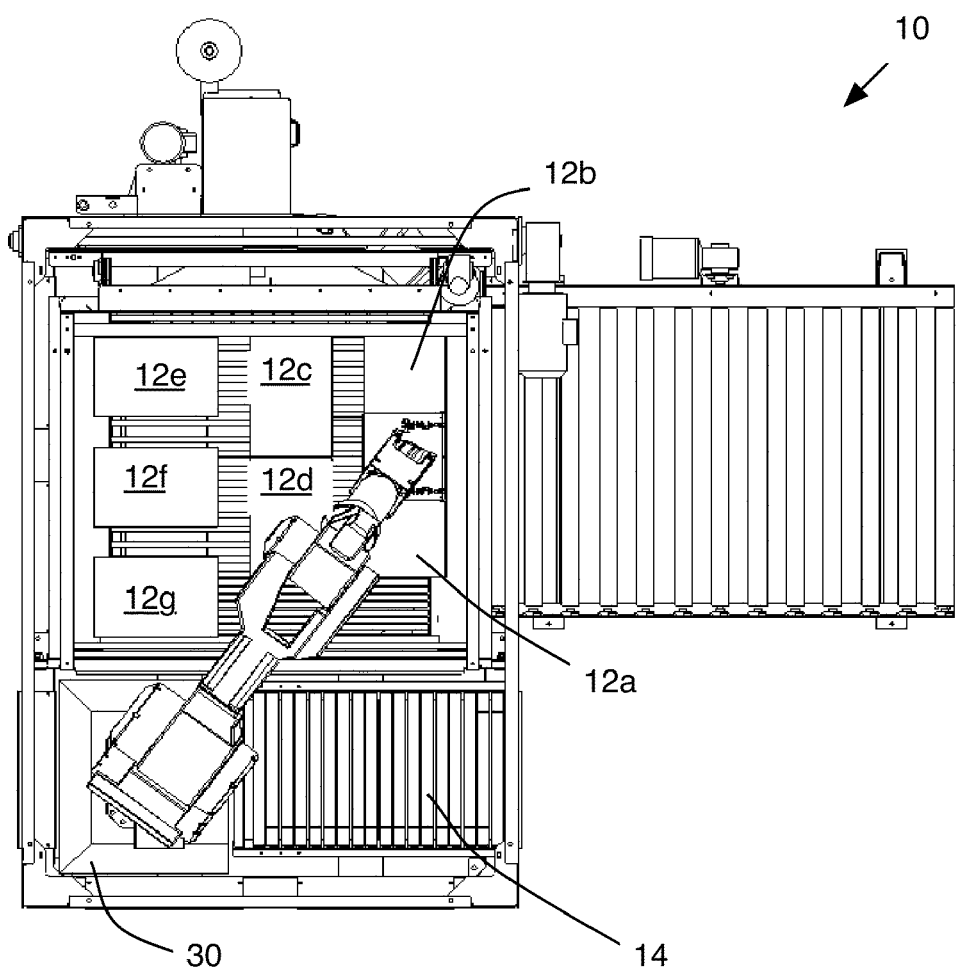
FIG. 12 is a top view of the embodiment of FIG. 11.

FIGS. 9-12 show another layer under construction. Each item on the platform 503 is located in a predetermined position according to a layer build pattern. However, some items (12a 12b 12c) are placed in a rough or loose position, each item being placed individually by the robot. But, items 12d and 12e are transferred simultaneously by the robot in a single pick and place operation. The robot picked both 12e and 12d at the same time, rotated the items 90-degrees and transferred the items to the layer queuing device. Meanwhile additional items arrive on the infeed conveyor (FIGS. 9-10) and are subsequently transferred to the layer queuing device (FIGS. 11-12). Thus, an oversized build layer is complete and will need subsequent conditioning prior to deposit on the pallet.

Figure 13:
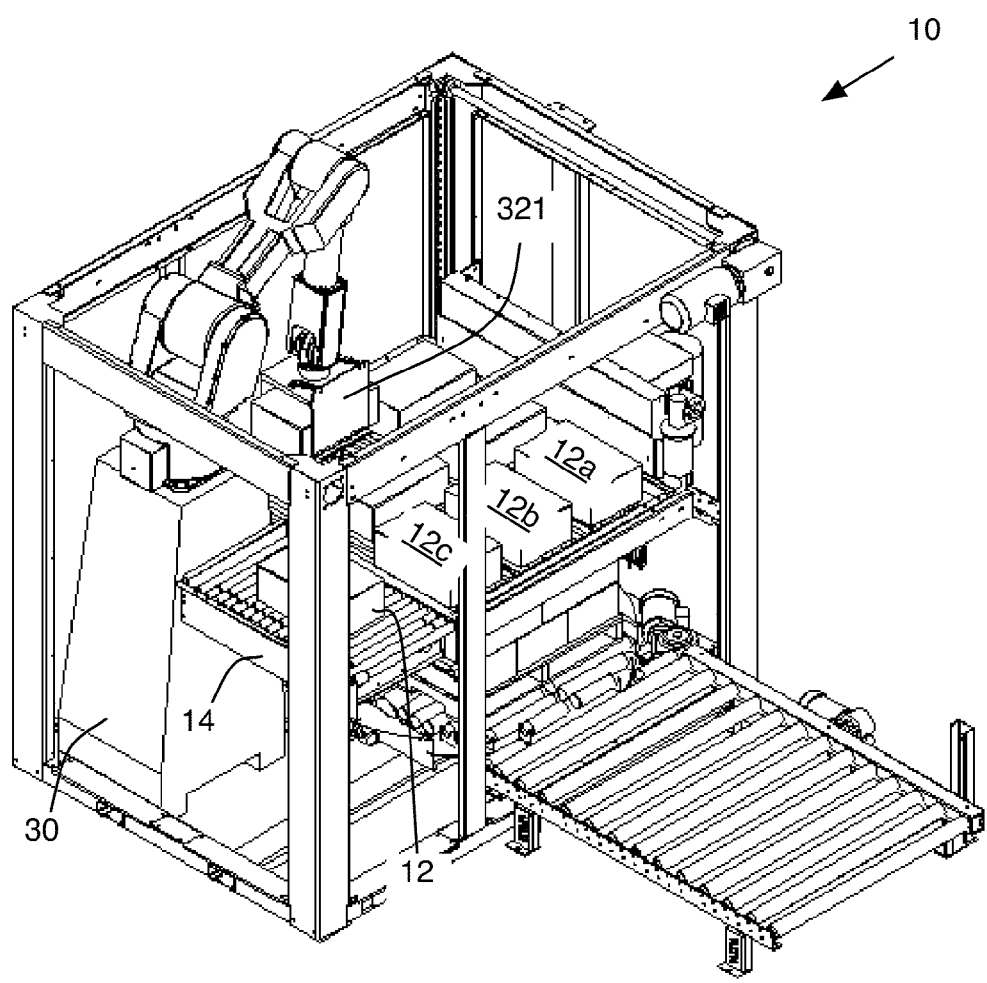
FIG. 13 is an offset frontal view of the embodiment of FIG. 1 in a sixth position.
Figure 14:
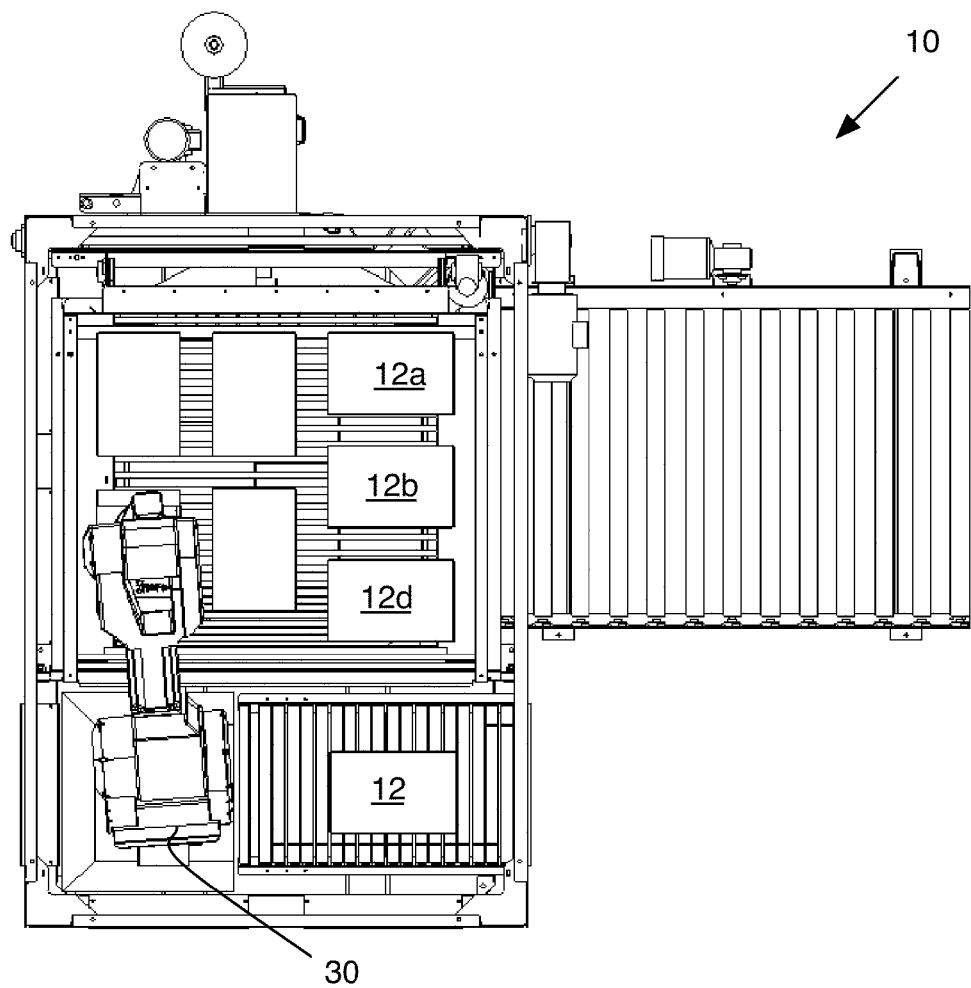
FIG. 14 is a top view of the embodiment of FIG. 13.

FIGS. 13-14 show a complete layer under construction consisting solely of loose positioned items, wherein the robot individually transferred each item. This finished, albeit oversized, layer will need subsequent conditioning prior to deposit on the pallet.

This preferred method, accordingly, includes steps for palletizing a plurality of items from an infeed system using a hybrid palletizer and item-handling system includes presenting the plurality of items 12 at an infeed system first height 16. Then, using a pick and place robot 30, transferring at least one item from the plurality of items to a predetermined position on a layer queuing device 50 having an apron, the layer queuing device being arranged at a layer build height within a vertical column. Then, vertically hoisting the layer queuing device from the layer build height to a layer deposit height within the vertical column and opening the apron and depositing a first layer comprising at least one item on an empty pallet area or previously deposited layer within the vertical column.

In one iteration, a second layer of items is built on the layer queuing device 50 after the first layer of items is deposited on the pallet. Simultaneous to the building of the second layer, a stretch-wrapping device 60 operates a turntable 80 and wraps the first layer.

Accordingly, the method further includes the steps of building a second layer of items on the layer queuing device, the second layer comprising at least a second item from the plurality of items and concurrently stretch wrapping the first layer while the second layer is being built.

In another embodiment, the layer queuing device includes a flexible apron with a selectively positionable assembly platform. This apron, in one embodiment, positions in a fully closed arrangement and the pick and place puts each item in a pre-determined and unique x and y coordinate position in the single plane defined by the layer-build platform. In an alternate embodiment, the apron floor indexes incrementally as the layer is built. Thus, the robot places each item at a unique x direction but the same y or approximately similar y coordinates, when one item grouping is complete, the floor indexes forward horizontally to present an open portion of the platform. This method, accordingly, includes steps for providing a selectively and horizontally indexable apron floor arranged on the layer queuing device within the vertical column; using the pick and place robot, transferring at least one item on the indexable apron floor at a first apron floor position; indexing the apron floor horizontally to a second apron floor position; and transferring a second at least one item to the layer queuing device at the second apron floor position.

In yet another configuration, the more than one layer of items is built on the layer queuing device before being deposited on the pallet. This method includes additional steps of: building a first layer comprising a first plurality of items on the layer queuing device by using the pick and place robot to transfer each item to a pre-determined position; building a second or more layers comprising a second or more plurality of items on the layer queuing device by using the pick and place robot to transfer each item to a pre-determined position; and opening the apron and simultaneously depositing more than one layer on the empty pallet area or previously deposited layers within the vertical column. The description above is not meant to preclude stacking items to create more than one layer prior to completing the first layer rough positioning.

Further, items may be rough-positioned on the assembly platform, allowing the robot to move quickly and, thus, sacrificing precision. Items are placed in a pre-determined position, but have clearance between each item and may present a build layer that is bigger than the finished pallet dimensions. However, a compression mechanism, operating independent of the robot, operates to compress the layer before depositing it on the pallet. The method, therefore, includes further steps comprising: using the pick and place robot, transferring a first plurality of items to predetermined rough-build positions on an apron floor of a layer queuing device; compressing the first plurality of items from the rough-build positions to a final-build-layer position by actuating at least one x-arm and one y-arm inward to compress the first plurality of items to a smaller x and y dimension on the apron floor; and depositing the first plurality of items in the final-build-layer position to the empty pallet area within the vertical column.

Figure 21:
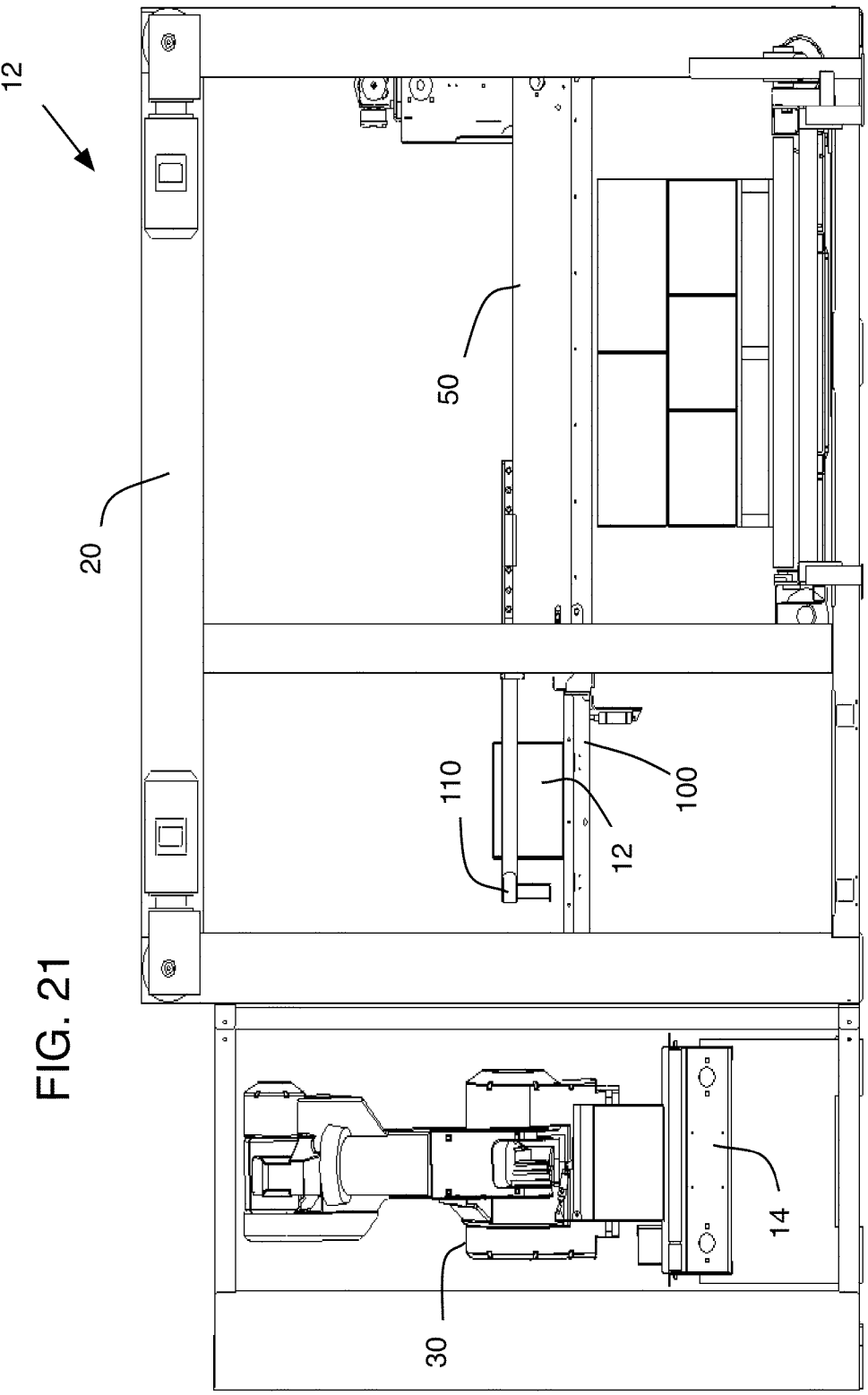
FIG. 21 is a front view of a second preferred embodiment of the present invention in a first position.
Figure 22:
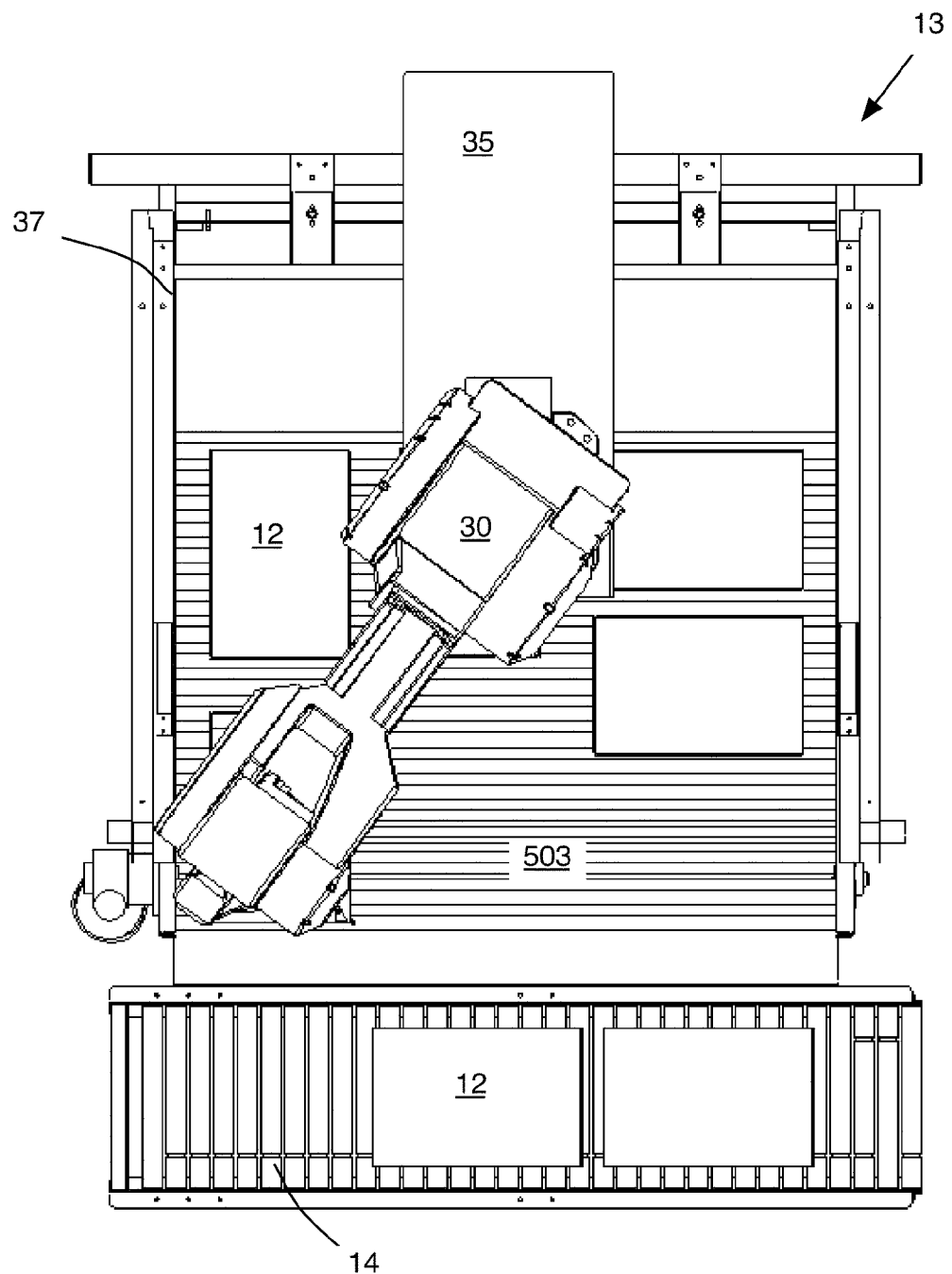
FIG. 22 is a top view of a third preferred embodiment according to the present invention.
Figure 23:
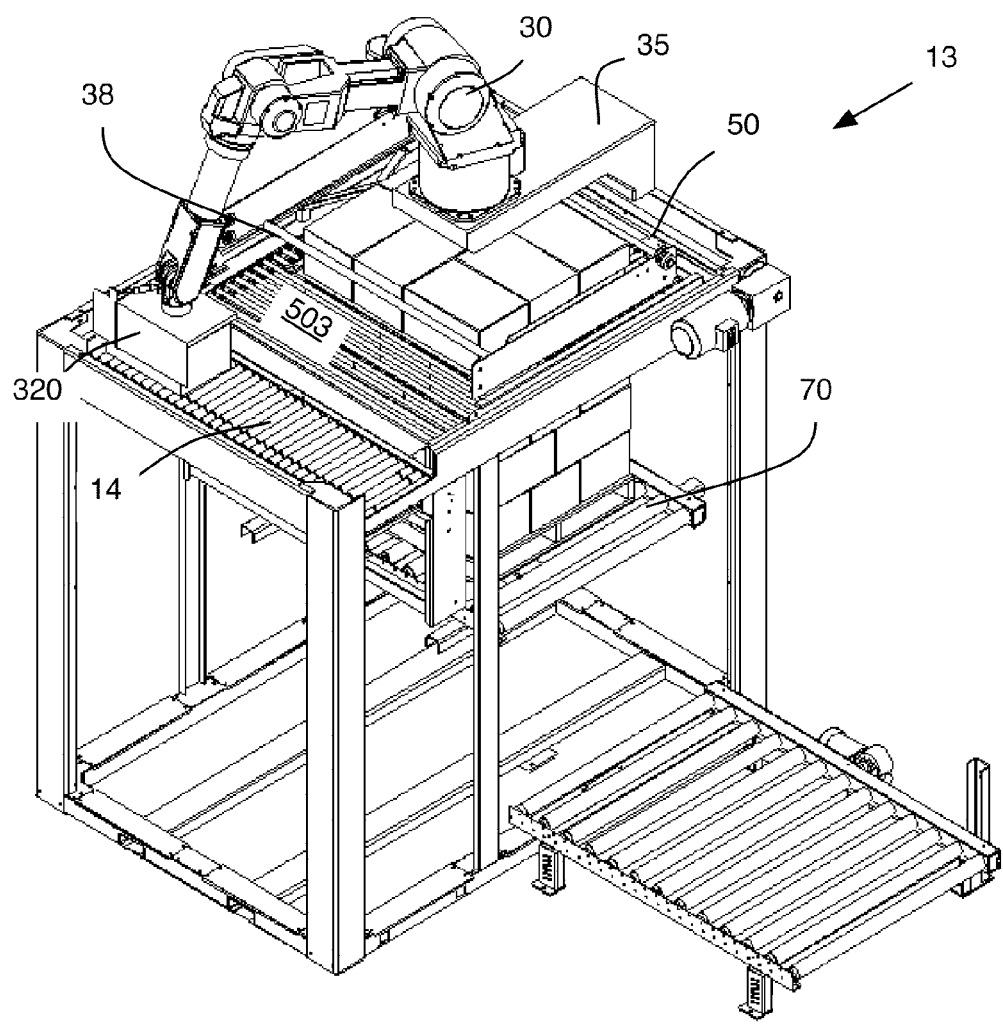
FIG. 23 is an offset front view of the embodiment of FIG. 22.

A second preferred embodiment, as FIG. 21 shows, includes a hybrid palletizer system 12 similar to the first embodiment, but including additional subsystems of a vertical transport platform 100 and a horizontal transfer mechanism 110. Similar to the first preferred embodiment, the second preferred embodiment of a hybrid palletizer comprises a frame 20 adapted to include a vertical transport platform adjacent to a layer queuing platform and intermediate to the layer queuing platform and the robot and infeed system. Within the frame, a vertical column of space is defined by intermediate vertical members 207, a portion of the horizontal beam 205, a pair of corner vertical members 203a (second corner not shown in Figures), and a corresponding portion of the bottom 201.

The infeed system 14 positions at a first height relative to the vertical column of space. This first height can be characterized as high-infeed (the layer build height being at approximately the same elevation as the first height, but the layer deposit height and pallet build height is always below the infeed first height), or an intermediate position, as depicted in the drawing. The intermediate infeed first height requires the layer queuing device to move up and down in the vertical column as the pallet is built. For example, the first several layers deposited on the pallet may require the layer queuing device 50 to move downwards relative to the infeed height in the vertical column to deposit the built layer on the pallet, and then the subsequent build layers would require the layer queuing element to move upwards relative to the infeed height to constantly clear the ever-growing pallet under construction.

This preferred embodiment further includes a vertical transport platform 100 adapted to independently and selectively reciprocate vertically adjacent to the vertical column of space. This platform 100 has a depth substantially about the same depth of the layer queuing device and has a width less than, and preferably, substantially about half the width, of the layer queuing device. This embodiment is well-suited for a slideably transfer of items from the infeed conveyor 14 by a pick and place robot 30 with an end effector 320 as FIG. 15 details, for example or receive items by pick and place as FIG. 19 details especially if more than one partial layer is stacked prior to transfer to the layer queuing device.

And, similar to the first embodiment, this second preferred embodiment contemplates a layer queuing device 50 within the vertical column of space and operable between a first position and a second position within the vertical column. The layer queuing device includes a horizontal transfer mechanism 110 consisting of a slideable arm assembly comprising two parallel links connected by a common member arranged generally perpendicular to the links. The slideable arm extends over the vertical column of space occupied by platform 100 and when platform 100 lifts to be at the same height as layer queuing device 50 transfer mechanism 110 retracts, thus pulling the item or items onto the apron. The horizontal transfer mechanism 110 (also shown as arm 527 in FIG. 6A) operates to simultaneously slidably transfer at least one item from the vertical transport platform.

The remaining structure and operation of the layer queuing device, previously described in the first embodiment, remains unchanged and any differences are discussed here, without repeating the previous description. These elements include a pallet-build area disposed within the vertical column of space, a robot operable to pick and place at least one item from the infeed system to the vertical transport platform. The robot 30 includes an end-effector. One suitable end-effector is a gripping element 321 disposed at the end of an arm 303, the gripping element and arm being operable to pick and place the at least one item from the infeed conveyor 14 to the vertical transport platform 100, the gripping element further comprising a bottom support picker 32. Similarly, the layer queuing device 50 further comprises an apron defining the layer-assembly height, the apron operable from a first closed position to a second open position and a compression mechanism disposed in the vertical column and operable to include relative movement in at least two directions in a single plane, the compression mechanism comprising a first x-direction arm and a second, oppositely disposed x-direction arm, transfer mechanism 110 provides first y-direction conditioning, and a second, oppositely disposed y-direction conditioning occurs when apron removal urges the item layer against backstop 525 to create a generally rectilinear space, the four sided conditioning elements cooperatively operable to condition the item layer from a first, loose-build position to a second compressed-build position. And, the system further includes a stretch wrap device positioned in the vertical column of space and being operable for concurrent and automated stretch wrapping of a plurality of pre-positioned items within the vertical column while at least one item is being transferred from the infeed system to the layer queuing device.

Additionally, the layer queuing device includes a four-axis compaction element wherein the first x-direction arm and the second, oppositely disposed x-direction arm are operable to selectively move toward each other to compact a plurality of items from a rough-build x-direction to a compact-build x direction and wherein the first transfer mechanism 110 and oppositely disposed y-direction backstop 525 arm are operable to selectively move to compact a plurality of items from a rough-build y-direction to a compact-build y direction.

Other elements contemplated by the preferred embodiments of the present invention include an infeed conveyor stop mechanism to restrict movement of at least one item in a pre-determined x-direction so robotic arm moves item/items to y-direction of loose-build position on the build platform, an oversized layer build platform 503 larger in the x and y directions than the finished pallet layer size.

A third preferred embodiment (as FIGS. 22-26 and 28 show) includes a hybrid palletizer system 13 including a top mounted robot 30. The robot arranges on a cantilevered gantry 35, which positions the robot above the vertical column of space. This is particularly well-adapted for a high infeed conveyor 14 position and a selectively indexing load floor 503. In this configuration, which is similar to the first embodiment in many ways, the robot can adapt to rapidly slide items from the infeed conveyor to the apron using an end effector such as the mechanism 320 as detailed in FIG. 15, for example. Thus, as a grouping of items is serially transferred to the apron, the load floor indexes one rank forward, presenting a new open rank for the next rank of items. The queuing device 50, when loaded, then moves downward to deposit the layer. It will be appreciated that for a high-infeed conveyor, this layout further reduces floor-space of the hybrid palletizer and allows for a rapid, and slideable transfer of items from the infeed device to the layer queuing platform. In one iteration, as FIGS. 23 and 28 particularly show, the stretch-wrapping component is omitted. This enables the pallet load station to move up and down within the vertical column. This enables the load platform 50 to remain stationary in the vertical column to reduce throughput time. Again, as in the third embodiment, an indexing load floor enables fast transfer of items from the high-infeed position conveyor. Here, however, the robot can simply slide items from the infeed conveyor to the load platform either directly to rough finished position on the apron or to a apron which indexes one rank position at a time until a complete layer is formed.

Figure 24:
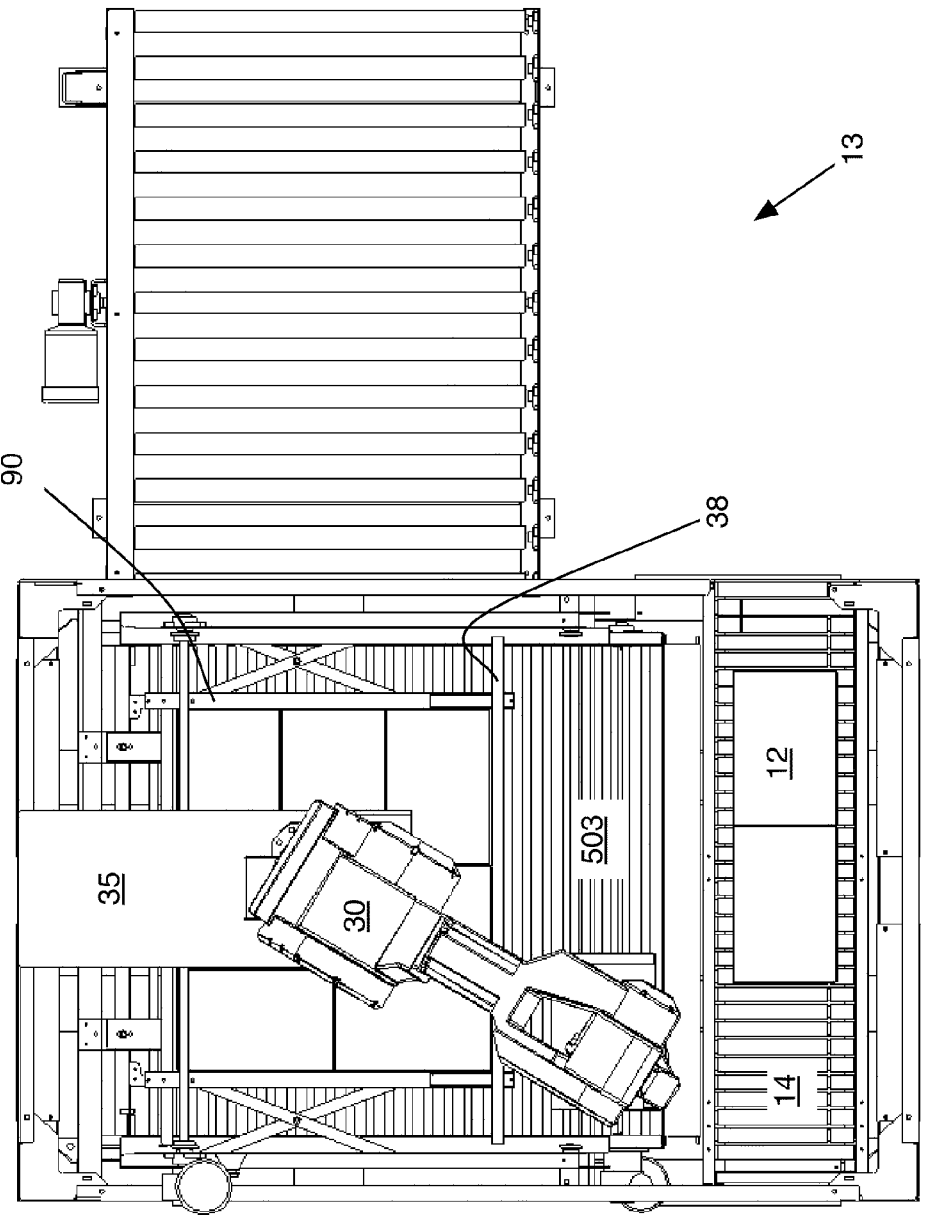
FIG. 24 is a top view of a fourth preferred embodiment according to the present invention.
Figure 25:
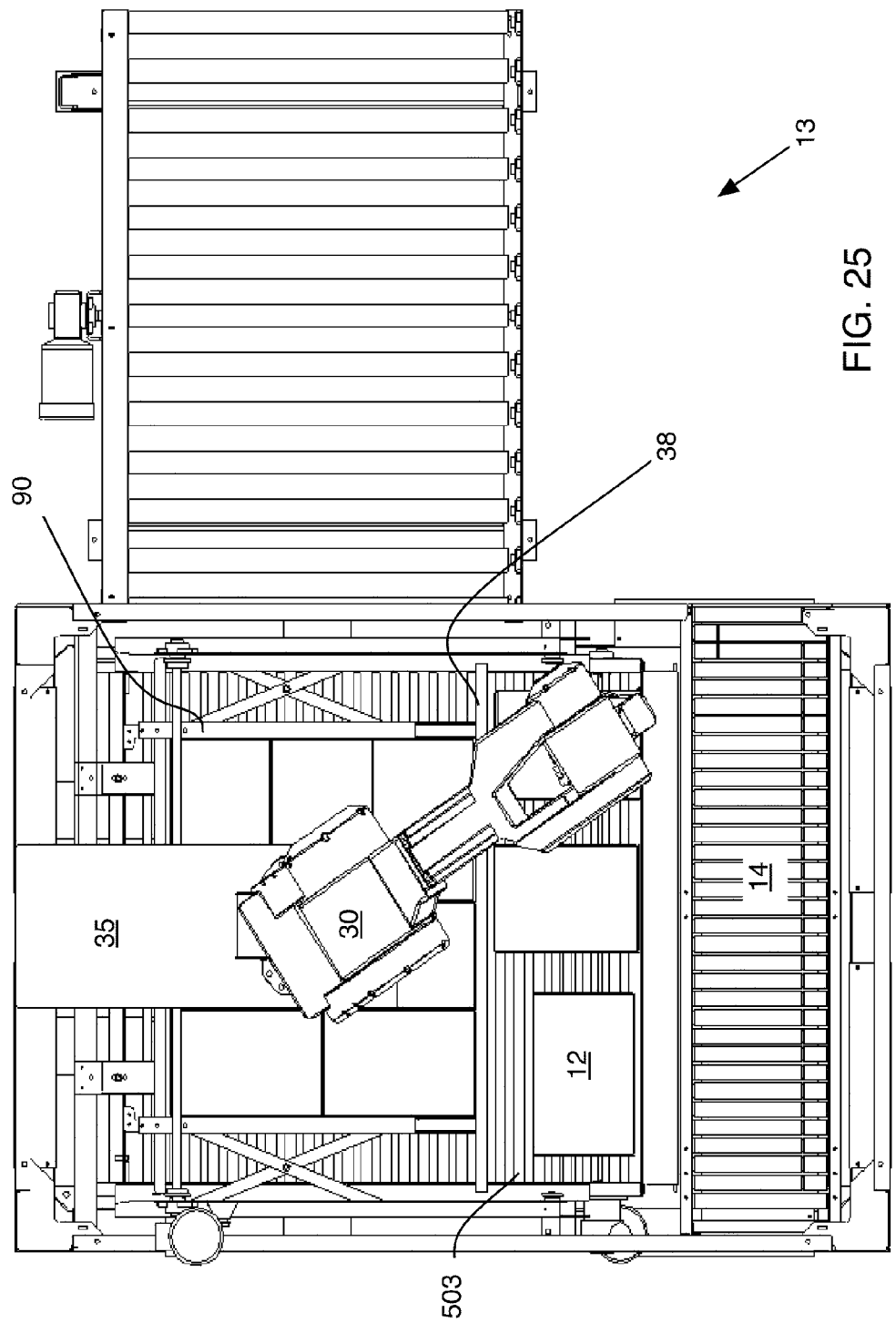
FIG. 25 is a top view of the embodiment of FIG. 24.
Figure 26:
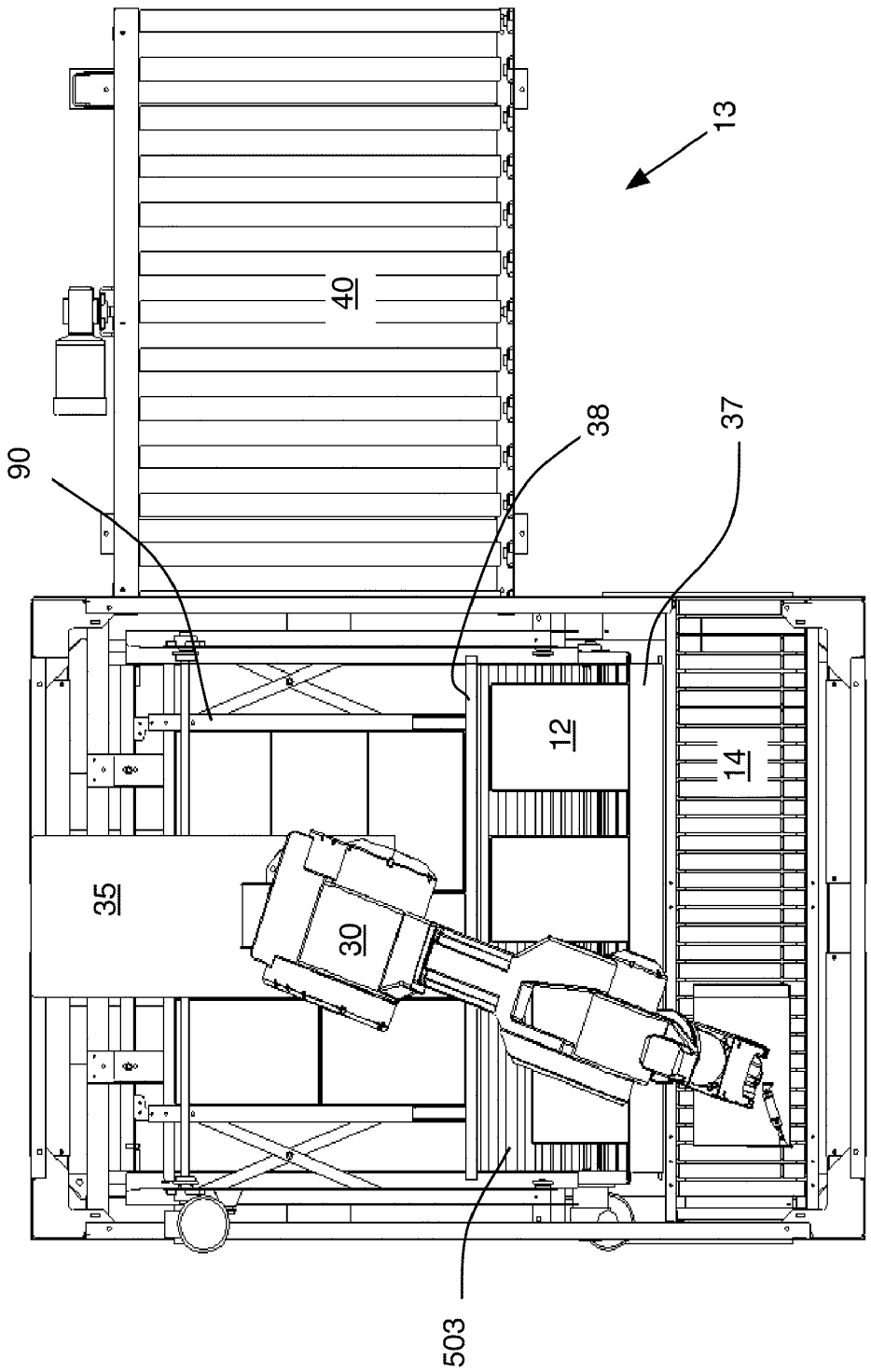
FIG. 26 is a top view of another position of the embodiment of FIG. 24 and shows a layer floor being retracted with a tilt-up dead plate 37 raised resisting movement of already positioned grouping of items during apron retraction.
Figure 28:
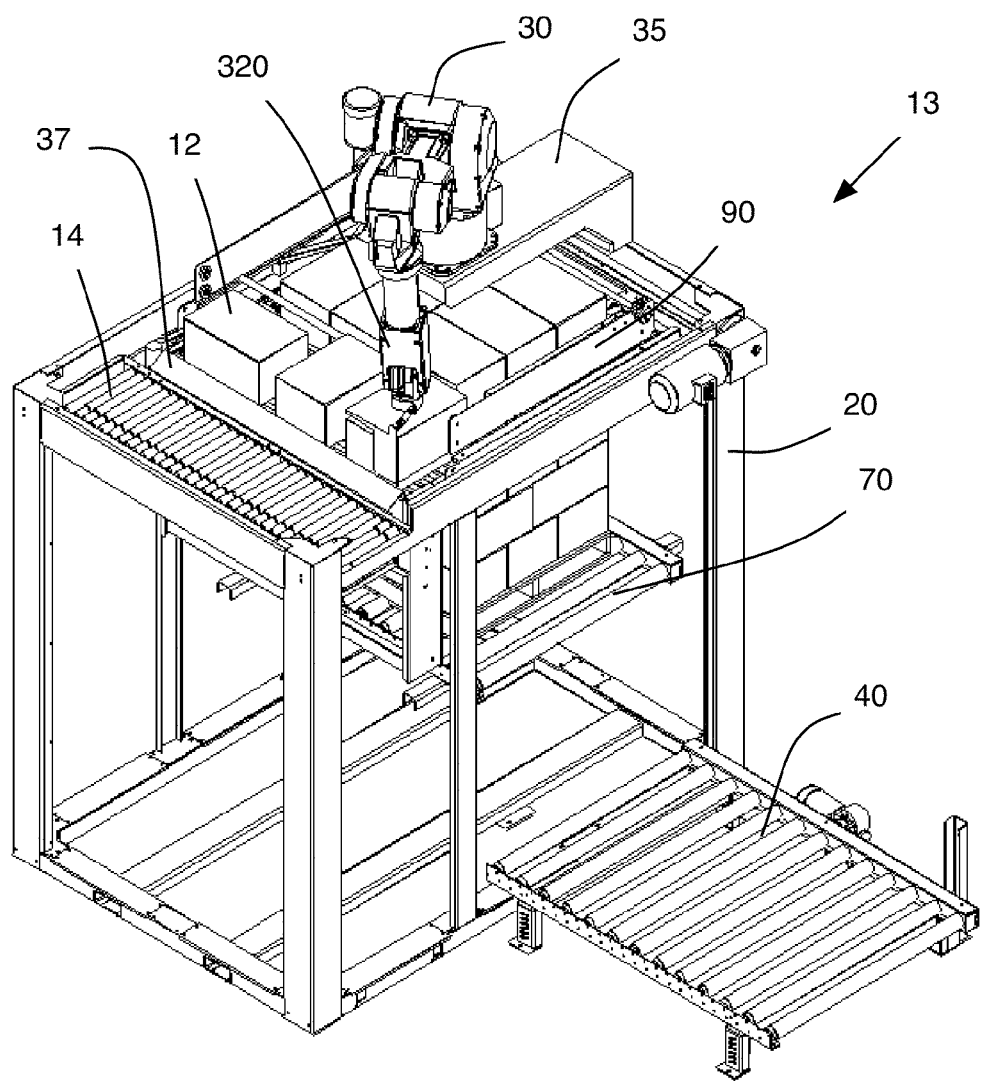
FIG. 28 is an offset front view of yet another position of the embodiment of FIG. 24.

FIGS. 22-26 and 28, one iteration of the high infeed hybrid palletizer with sliding into rough position on an indexing apron capable of receiving more than one layer, show items being palletized progressively with an indexing load floor. Sliding is more efficient in most instances, but some products are not suitable for sliding due to center of gravity challenges or unsuitable flexibility of some items. In such instances pick and place methods previously described are equally applicable. FIG. 26 and FIG. 28 show a tilt-up dead plate 37 that is normally in the same plane as the apron and infeed. During floor removal it pivots up to prevent already positioned items from sliding off the apron so that they then become the first items for the next layer. While it is tipped up additional items can be slid over the top if necessary. A similar, but simpler design is to position the infeed at an elevation slightly above the apron so there is always a barrier ledge due to the elevation difference that item or items can be slid across avoiding secondary mechanisms such as the tilt up dead plate. Alternatively to the tilt-up dead plate 37 can be a barrier that actuates from above. The purpose is to allow continual item positioning of new items destine for the next layer on the same apron mechanism while layer compression and deposit occurs on an already completed layer in a minimal amount of space.

FIGS. 24-26 and 28 show the top-mounted robot 30 with an indexing load floor 503 on a stationary layer queuing device 50 with compression mechanism 90. Accordingly, in this high-infeed 14 example, the items are slideably transferred to the indexing floor 503. The compression mechanism 90 compacts the layer in the x and y direction when the layer is complete. And the roller floor opens to deposit the built layer to the pallet. At the same time, items are continually slid from the infeed conveyor and a barrier 38 (which also serves as a y-direction or y-axis clamp) prevents the items from moving to the build-area on the layer queuing device. Specifically, FIG. 24 shows two new items arriving on the infeed conveyor and a built layer being compressed on the layer queuing platform. FIG. 25 shows the new items being slideably transferred from the infeed conveyor to the oversized layer queuing device's load platform 503, which is an indexing roller curtain or slat apron. Barrier 38 prevents items from traveling to the build area as the compression mechanism retains the built layer in the appropriate x and y dimensions and position over the pallet (not shown) below. FIG. 26 shows the apron opening, allowing the built layer to deposit on the pallet (not shown). FIG. 28 shows the ability of the robot to turn an item 90 degrees as it slideably transfers from the infeed conveyor to the oversized layer queuing device.

The third preferred embodiment as described above is not limited to one robot or the robot mounting position shown. Higher speed applications benefit from more than one robot and sliding items into rough position and robot position will change depending in the application. Furthermore the apron in some instances will be a single indexing plate rather than a flexible apron. As previously discussed bags are handled more efficiently on a plate apron, as are some other products. Furthermore a plate apron compliments a static ledge backstop when the infeed plane is elevated slightly above the apron plane.

A fourth preferred embodiment (as FIG. 29 shows and as FIG. 6A details) includes a chute component 120, which can be combined in the first preferred embodiments. This is particularly useful for bagged items. Bagged items, as opposed to rigid box-like items, have a more fluid structure and will conform to the contour of the previous layer. Thus, it is desirable to pick the bag item by a gripping element specifically adapted to grab bags. This gripping element is understood in the art as a basket. As such the bag-specific gripping element picks up, transfers and drops the bag a slight distance to the load platform. When this is done, a guide or fixture sized to match the finished pallet x and y dimension is helpful to retain the build layer within the proper overall pallet dimensions. Accordingly, a chute component 120 positioned relative to the layer queuing device 50 ensures proper positioning of dropped bagged items and increases throughput speed of the hybrid palletizer 10 of the current invention over the conventional art.

The chute component 120 includes four vertical walls 121, 122, 123, 124 arranged to form a rectilinear jig on top of the load platform. A pair of center-opening roller curtains 503a 503b form the apron. The apron is selectively positionable from a closed to an open position or any intermediate position via motor 505 and driveshaft 511 (additional transfer mechanisms including sprockets and chains would also be used, as understood by those of ordinary skill in this art). The rectilinear jig is configured in a pre-determined x and y dimension during a set-up operation and remains in a relative fixed position on top of the layer queuing device 50. In one embodiment, the layer queuing device adapts to move vertically up and down within the vertical column, as described in relation to the first embodiments. Alternatively, the chute component adapts for use as a fixed layer queuing device, for example of the third preferred embodiment when items are picked and placed.

The chute including apron 503A can be operated so that deposit cycles are reduced by keeping the floor open during deposit cycles directly depositing to the pallet or previously deposited layers. When concurrent wrapping cycles occurs for instance or during pallet exchange when a pallet is not immediately available for receiving items it is possible to close the apron stacking more than one or more layers in the chute aperture to allow continual palletizing when time consuming concurrent wrapping or pallet exchange need arise.

The chute enables concurrent wrapping as it provides a queue for continued layer assembly while wrapping occurs and the ability to stack more than one layer in the chute to enhance queuing ability for higher speed concurrent wrapping.

Although the invention has been particularly shown and described with reference to certain embodiments, it will be understood by those skilled in the art that various changes in form and detail may be made without departing from the spirit and scope of the invention.

We claim:

1. An item handling and stacking system adapted to receive at least one item from an infeed system presented at a first height, the item handling and stacking system comprising:
    a frame defining a generally vertical column of space;
    a layer queuing device within the vertical column of space and operable within the vertical column, the layer queuing device comprising a layer assembly platform where items are placed for layer assembly, and the layer queuing device further adapted to independently and selectively reciprocate vertically in the vertical column of space,
    the layer queuing device further comprising
        an apron operable from a first closed position to a second open position, and
        a compression mechanism operable to include relative movement in at least two directions in a single plane, the compression mechanism comprising a first x-direction arm and a second, oppositely disposed x-direction arm, and a first y-direction barrier arranged generally perpendicular to the first x-direction arm and cooperating with both arms to define a generally rectilinear space;
    a pallet-build area disposed within the vertical column of space and positioned under the layer queuing device;
    a pick-and-place robot disposed adjacent to the vertical column of space, the robot adapted to transfer the at least one item from the infeed system at the first height to a predetermined position on the layer queuing device; and
    a stretch wrapping device comprising
        means for automatic wrap start and wrap cut after wrapping completion,
        a turntable positioned in the vertical column of space and adapted to selectively rotate, and
        a wrap dispensing system adjacent to the turntable, the dispensing system being operable to concurrently wrap a plurality of item layers within the vertical column while at least one item is being transferred from the infeed system to the layer assembly platform.

2. The item handling and stacking system according to claim 1 in which the layer queuing device further comprises:
    a flexible apron comprising at least one roller curtain floor operable between open and closed positions.

3. The item handling and stacking system according to claim 1 in which the layer queuing device further comprises:
    a flexible apron comprising at least two roller curtain floors operable to selectively index in the same horizontal plane, the first roller curtain floor following a first continuously looped path and operable in a clockwise direction and the second roller curtain floor following a second continuously looped path and operable in an anti-clockwise direction.

4. The item handling and stacking system according to claim 1 in which the layer queuing device further comprises:
    a rigid apron comprising at least one floor panel operable to actuate from a closed position to an open position.

5. The item handling and stacking system according to claim 1 in which the pick-and-place robot further comprises:
    a gripping element disposed at the end of an arm, the gripping element and arm being operable to pick and place the at least one item from the infeed system and transfer the at least one item to a predetermined location on the layer queuing device, the gripping element further comprising a bottom support picker.

6. The item handling and stacking system according to claim 1 wherein the apron of the layer queuing device comprises an oversized layer assembly platform having an at least two-axis compression mechanism operable to position the at least one item on the oversized layer assembly platform from a first loosely placed position to a second compressed position, the second compressed position approximating a finished pallet dimension.

7. The item handling and stacking system according to claim 1 wherein:
    the vertical column of space includes a finish-build height defined by a final pallet layer comprising a plurality of items deposited by the layer queuing element; and
    the finish-build height is the same or lower than the infeed system first height.

8. The item handling and stacking system according to claim 7 wherein the pick-and-place robot further comprises:
    a robotic end effector adapted sliding items from the infeed conveyor to the layer assembly platform, the end effector comprising a variable sized push bar, the push bar comprising a positionable hand, the hand being operable from 0-degrees rotation to 270-degrees rotation relative to the push bar whereby a rotation of 0-degrees enables the hand to be folded on the push bar and whereby 180-degrees rotation enables the hand and push bar to cooperatively extend the effective length of the push bar, and whereby 270-degrees rotation creates a right-angle with the push bar.

9. The item handling and stacking system according to claim 8 wherein the robotic end effector is operable to rotate the at least one item 90-degrees from a first orientation to a second orientation.

10. The item handling and stacking system according to claim 1 wherein:
    the vertical column of space includes a finish-build height defined by a final pallet layer comprising a plurality of items deposited by the layer queuing element; and
    the finish-build height is higher than the infeed system first height.

11. The item handling and stacking system according to claim 1 wherein:
    the robot is operable to transfer a plurality of items from the infeed conveyor to the layer queuing device; and
    the layer queuing device adapts to receive the plurality of items to form multiple layers on the layer queuing device.

12. A hybrid palletizer comprising:
    a frame defining a generally vertical column of space;
    an infeed system positioned at a first height relative to the vertical column of space;

a vertical transport platform adapted to independently and selectively reciprocate vertically adjacent to the vertical column of space;

a layer queuing device within the vertical column of space and operable between a first position and a second position within the vertical column, the layer queuing device comprising a layer assembly platform where items are placed for layer assembly and the layer assembly platform defining a selectively adjustable layer-assembly height and further operable to receive at least one item at the layer-assembly height, the layer-assembly height being intermediate to the first and second positions, and the layer queuing device further adapted to independently and selectively reciprocate vertically in the vertical column of space, the layer queuing device further comprising a selectively openable and closable apron;

a pallet-build area disposed within the vertical column of space; and a robot operable to pick and place at least one item from the infeed system to the vertical transport layer assembly platform.

13. The hybrid palletizer of claim 12 in which the robot further comprises:

a gripping element disposed at the end of an arm, the gripping element and arm being operable to pick and place the at least one item from the infeed conveyor to the vertical transport layer assembly platform, the gripping element further comprising a bottom support picker.

14. The hybrid palletizer of claim 12 wherein:

the layer queuing device further comprises a transfer mechanism operable to slidably transfer at least one item from the vertical transport platform.

15. The hybrid palletizer of claim 12 wherein:

the layer queuing device further comprises an apron defining the layer assembly height, the apron operable from a first closed position to a second open position and a compression mechanism disposed in the vertical column and operable to include relative movement in at least two directions in a single plane, the compression mechanism comprising a first x-direction arm and a second, oppositely disposed x-direction arm, a first y-direction arm, and a second, oppositely disposed y-direction arm whereby the four arms cooperate to define a generally rectilinear space, the four arms cooperatively operable from a first, loose-build position to a second compressed-build position;

and wherein the hybrid palletizer and item handling system further comprises a stretch wrap device positioned in the vertical column of space and being operable for concurrent and automated stretch wrapping of a plurality of pre-positioned items within the vertical column while at least one item is being transferred from the infeed system to the layer queuing device.

16. The hybrid palletizer of claim 15 wherein the compression mechanism further comprises:

a four-axis compaction element wherein the first x-direction arm and the second, oppositely disposed x-direction arm are operable to selectively move toward each other to compact a plurality of items from a rough-build x-direction to a compact-build x direction and wherein the first y-direction arm, and the second, oppositely disposed y-direction arm are operable to selectively move toward each other to compact a plurality of items from a rough-build y-direction to a compact-build y direction.

17. An item handling and stacking system adapted to receive at least one item from a high infeed system presented at a first height, the item handling and stacking system comprising:

a frame defining a generally vertical column of space;

a layer queuing device within the vertical column of space, the layer queuing device comprising a layer assembly platform where items are placed for layer assembly, the layer assembly platform selectively vertically adjustable in the vertical column of space to a layer-assembly height and operable to receive at least one item at a layer-assembly height, the layer queuing device further comprising an apron operable from a first closed position to a second open position;

a pallet-build area disposed within the vertical column of space and positioned under the layer queuing device; and a pick-and-place robot adapted to transfer the at least one item from the infeed system at the first height to a predetermined position on the layer queuing device at the layer assembly height.

18. The item handling and stacking system according to claim 17 in which the pick-and-place robot further comprises:

a robotic end effector adapted sliding items from the infeed conveyor to a vertical transport platform, the end effector comprising a variable sized push bar, the push bar comprising a positionable hand, the hand being operable from 0-degrees rotation to 270-degrees rotation relative to the push bar whereby a rotation of 0-degrees enables the hand to be folded on the push bar (for a compact position) and whereby 180-degrees rotation enables the hand and push bar to cooperatively extend the effective length of the push bar, and whereby 270-degrees rotation creates a right-angle with the push bar.

19. An item handling and stacking system adapted to receive at least one item from an infeed system presented at a first height, the item handling and stacking system comprising:

a frame defining a generally vertical column of space;

a layer queuing device within the vertical column of space and selectively operable to reciprocate between a first position and a second position within the vertical column, the layer queuing device comprising a layer assembly platform where items are placed for layer assembly and the layer assembly platform defining a selectively adjustable layer-assembly height and further operable to receive at least one item at the layer-assembly height, the layer-assembly height being intermediate to the first and second positions, the layer queuing device further comprising an apron operable from a first closed position to a second open position;

a pallet-build area disposed within the vertical column of space and positioned under the layer queuing device; and a pick-and-place robot adapted to transfer the at least one item from the infeed system at the first height to a predetermined position on the layer queuing device at the layer-assembly height.

* * * * *